(12) United States Patent
Teixeira

(10) Patent No.: US 10,334,199 B2
(45) Date of Patent: Jun. 25, 2019

(54) AUGMENTED REALITY BASED COMMUNITY REVIEW FOR AUTOMOBILE DRIVERS

(71) Applicant: Microsoft Technology Licensing, LLC, Redmond, WA (US)

(72) Inventor: Steven L. Teixeira, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/651,943

(22) Filed: Jul. 17, 2017

(65) Prior Publication Data

US 2019/0020844 A1 Jan. 17, 2019

(51) Int. Cl.
 *G09B 7/02* (2006.01)
 *H04W 4/21* (2018.01)
 (Continued)

(52) U.S. Cl.
 CPC ........... *H04N 5/44504* (2013.01); *B60Q 9/00* (2013.01); *G02B 27/0172* (2013.01); *G02B 27/0179* (2013.01); *G06F 3/012* (2013.01); *G06F 3/013* (2013.01); *G06F 3/16* (2013.01); *G06Q 10/103* (2013.01); *G06Q 50/01* (2013.01); *G08G 1/0112* (2013.01); *G09B 7/02* (2013.01); *G09B 19/14* (2013.01); *G09B 19/167* (2013.01); *H04W 4/21* (2018.02); *G02B 2027/014* (2013.01); *G02B 2027/0132* (2013.01);
 (Continued)

(58) Field of Classification Search
 CPC ........... G06F 1/163; G06F 3/013; G06F 3/017
 See application file for complete search history.

(56) References Cited

U.S. PATENT DOCUMENTS 8,965,460 B1 2/2015 Rao et al.
2014/0195272 A1* 7/2014 Sadiq ..................... G06Q 40/08
 705/4
(Continued)

FOREIGN PATENT DOCUMENTS

WO 2017053616 A1 3/2017

OTHER PUBLICATIONS

Sayer, Mathew, "Could AR Cure Road Rage?", http://www.futureofeverything.io/2017/03/01/ar-cure-road-rage/, Published on: Mar. 1, 2017, 3 pages.
(Continued)

*Primary Examiner* — Jitesh Patel
(74) *Attorney, Agent, or Firm* — Fountainhead Law Group P.C.

(57) ABSTRACT

Disclosed is an infrastructure to support an augmented reality (AR) based community for drivers. Each driver's view (e.g., using an AR device) of other vehicles on the road can be augmented with virtual information about other drivers in the community. Drivers in the community can express their opinions on the driving behavior of other drivers in the community. Drivers' opinions can be accumulated and tallied to produce a cumulative assessment of a particular behavior for a particular driver. A driver's view through their AR device and be further augmented with the community's assessment of that driver's driving behavior, which can influence the driver's future behavior.

18 Claims, 17 Drawing Sheets

(51) Int. Cl.
- *H04N 5/445* (2011.01)
- *G06F 3/16* (2006.01)
- *G06F 3/01* (2006.01)
- *G02B 27/01* (2006.01)
- *G08G 1/01* (2006.01)
- *B60Q 9/00* (2006.01)
- *G09B 19/16* (2006.01)
- *G09B 19/14* (2006.01)
- *G06Q 10/10* (2012.01)
- *G06Q 50/00* (2012.01)

(52) U.S. Cl.
CPC ............... *G02B 2027/0141* (2013.01); *G02B 2027/0178* (2013.01); *G02B 2027/0187* (2013.01)

(56) References Cited

U.S. PATENT DOCUMENTS

| | | |
|---|---|---|
| 2014/0354684 A1 | 12/2014 | Beckwith et al. |
| 2015/0118652 A1* | 4/2015 | Lawrenson ............ G06Q 30/02 434/62 |
| 2015/0375679 A1 | 12/2015 | Ann et al. |
| 2016/0163108 A1 | 6/2016 | Kim |
| 2016/0300119 A1* | 10/2016 | Silva ................. G06F 17/30321 |
| 2017/0192401 A1 | 7/2017 | Wexler et al. |
| 2017/0305434 A1* | 10/2017 | Ratnasingam ........ B60W 40/09 |

OTHER PUBLICATIONS

Wang, et al., "CarNote: Reducing Misunderstanding between Drivers by Digital Augmentation", In Proceedings of the 22nd International Conference on Intelligent User Interfaces, Mar. 13, 2017, pp. 85-94.

Kruger Silveria Santos, Michelle, "Virtual Windshields: Merging Reality and Digital Content to Improve the Driving Experience", In Thesis of University of Porto, Jul. 2013, 114 pages.

Berman, Bradley, "Augmented Reality May Be Coming to a Car Windshield near You", http://readwrite.com/2014/03/19/car-windshields-augmented-reality/, Published on: Mar. 19, 2014, 13 pages.

"International Search Report and Written Opinion Issued in PCT Application No. PCT/US2018/034805", dated Sep. 6, 2018, 11 Pages.

* cited by examiner

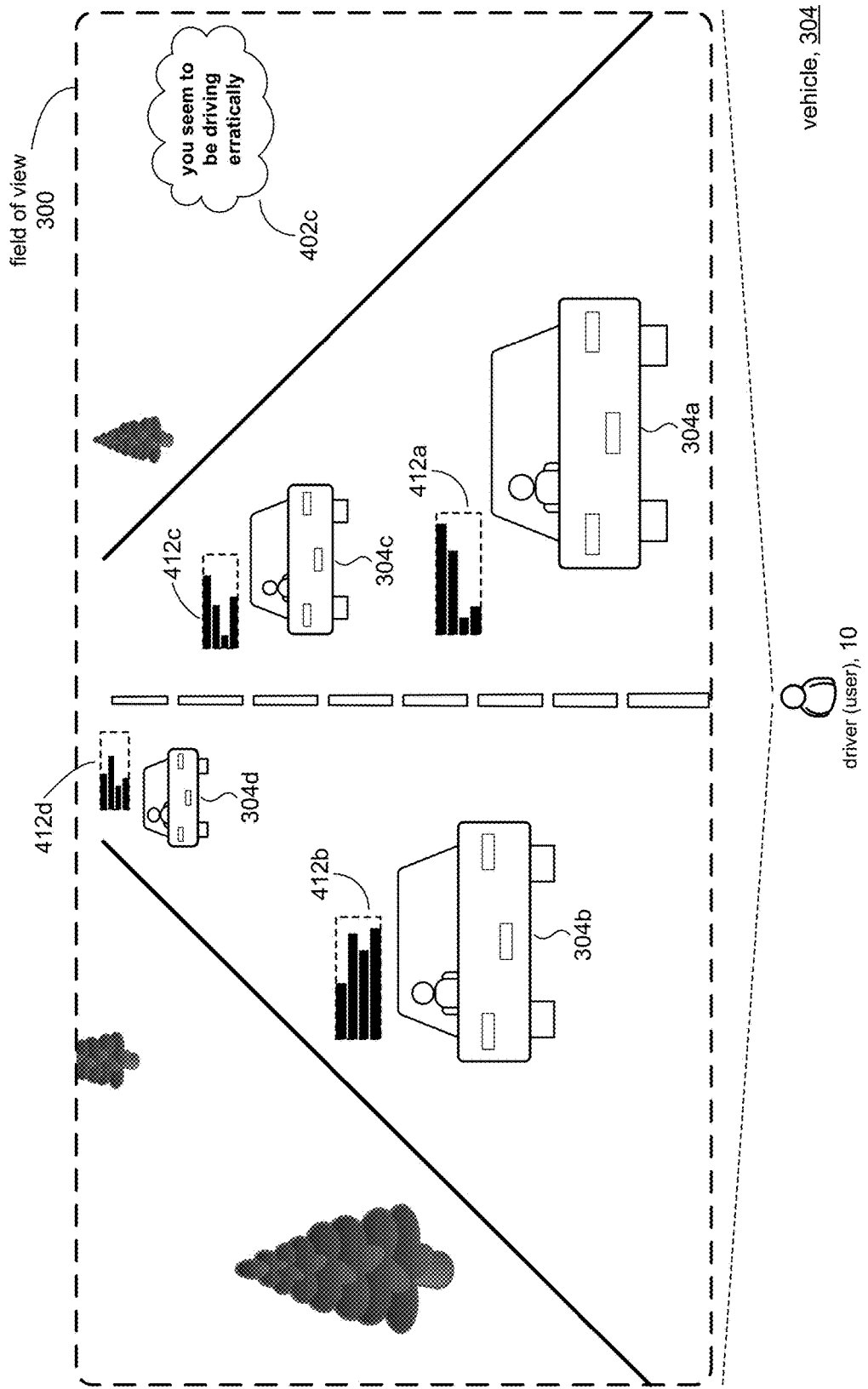

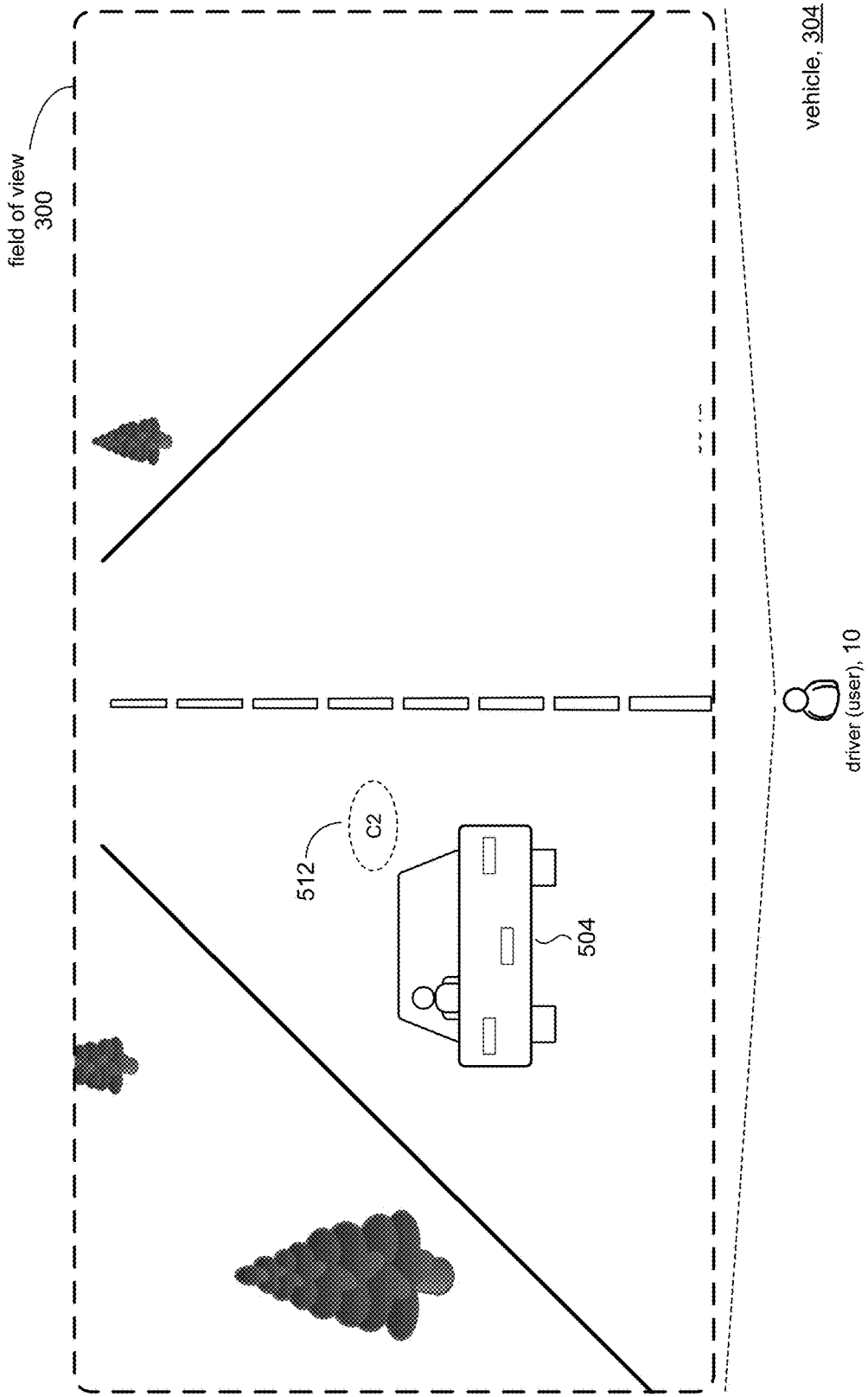

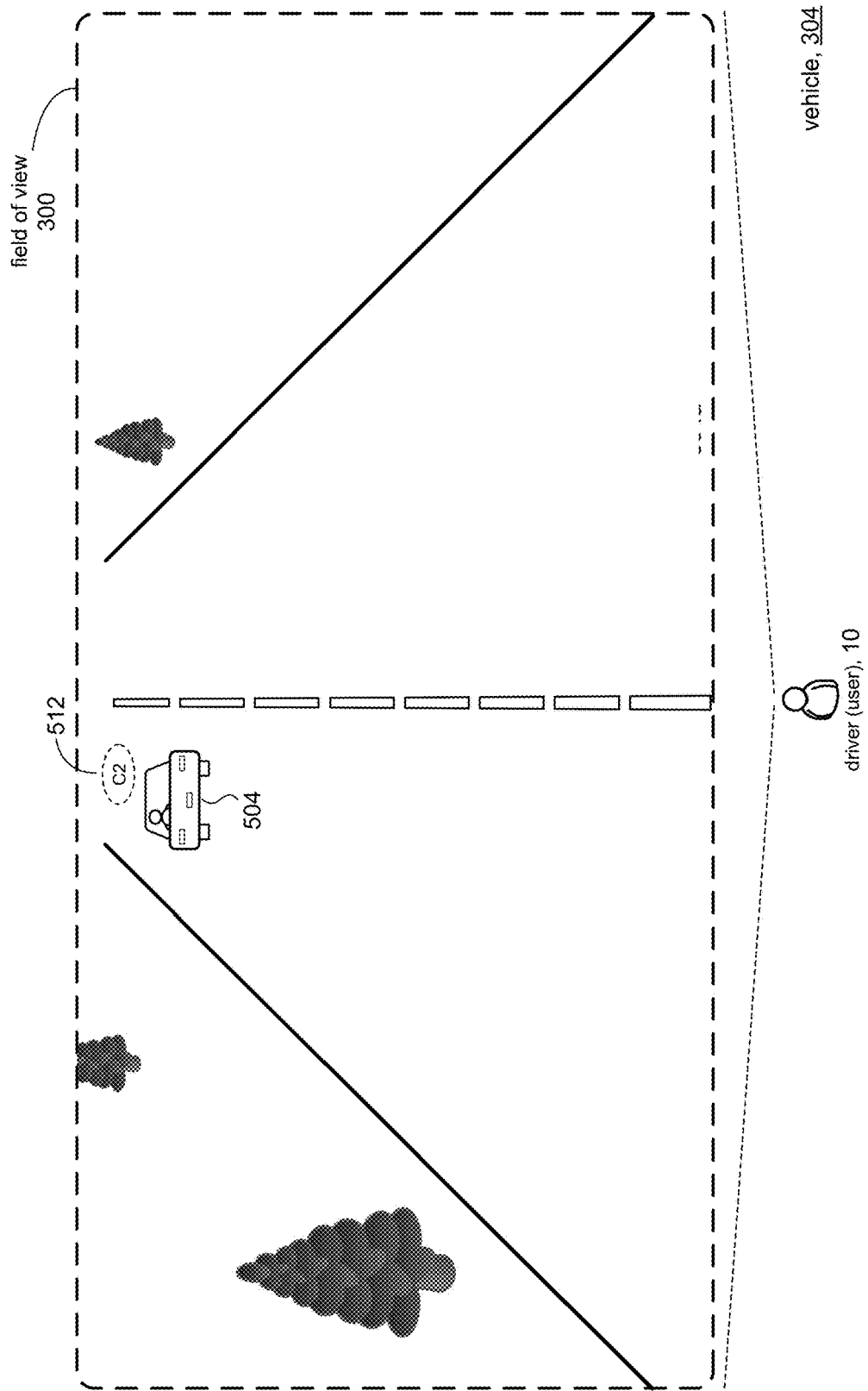

AUGMENTED REALITY BASED COMMUNITY REVIEW FOR AUTOMOBILE DRIVERS

BACKGROUND

Augmented reality is a technology that superimposes a computer-generated image on a user's view of the real-world, thus providing a composite (augmented) view of their real-world surroundings. The augmentation is usually done by adding extra data (e.g., holograms) to the real-world objects around the user. Consider, for example, a user who is traveling abroad. Suppose the user is interested in the history of the nearby buildings. The user can launch a history app enhanced with augmented reality capability on their smartphone and connect to the Internet. The app looks through the smartphone's camera and shows the real-world surroundings to the user. The user can point the smartphone at a building and in response the app can show a graphical callout (e.g., hologram) that provides some historical information next to the building, thus augmenting the real-world object (i.e., the building) with virtually generated information.

Augmented reality (AR) devices can come in a wearable form factor. The wearable AR device can be Internet enabled. The AR device can include a semi-transparent display that allows the user to view their real-world surroundings. The user can provide input (e.g., spoken commands) to the AR device to call up information about their real-world surroundings. In response, the AR device can display virtual information on the display, thus superimposing the information over the user's view of their real-world surroundings.

SUMMARY

The present disclosure describes a system for an augmented reality (AR) based social community for drivers. In various embodiments, a driver's vehicle can be configured to provide an AR experience while driving. The system can provide the driver's vehicle telemetry that provides information about nearby community members and their vehicles on the road. The system can augment the driver's view of their real-world surrounding, as seen through a wearable augmented device for example, with virtual objects that represent information obtained from the received telemetry. In some embodiments, for example, the information can include assessments of those drivers (e.g., their driving behavior) as voted on or otherwise rated by members of the driving community. In some embodiments, the system can provide the AR experience using a heads up display configured with an AR display system.

In accordance with the present disclosure, the received telemetry can include information that represents the community's assessment of the driver's own driving behavior. The system can further augment the driver's view of their real-world surrounding with virtual objects that represent such information.

In accordance with the present disclosure, the system can allow a driver to assess another driver's behavior on the road, for example, by describing that other driver's vehicle and speaking words or phrases that indicate a particular behavior and a positive or negative assessment of the behavior. The system can tally up these "votes" for all behaviors of all drivers, and present the resulting cumulative assessments to drivers in the community.

The following detailed description and accompanying drawings provide further understanding of the nature and advantages of the present disclosure.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings:

FIGS. 4A, 4B, and 4C illustrate further aspects of an augmented reality scene in accordance with the present disclosure.

FIGS. 5A, 5B, 5C illustrate registration of vehicle indicia in accordance with the present disclosure.

DETAILED DESCRIPTION

The present disclosure describes using augmented reality (AR) technology to support a social network or community of automobile drivers. The present disclosure enables and facilitates an AR technology based system to provide a driver with information about other drivers. In various embodiments, each participating driver's view of other vehicles on the road can be augmented to display information about the other vehicles and drivers on the road. This augmentation can be facilitated via augmented reality (AR) eyewear or via projection on a vehicle's windshield (e.g., as in a heads-up display). From the perspective of the driver, information about other vehicles and drivers appear "attached" to those vehicles as they move around on the road.

The system can provide the ability for each participant to express opinions regarding other drivers, such as offering a positive or negative assessment of each interaction with another driver. The cumulative results of these assessments (for example, a "plus-minus rating" that measures total positive assessments less total negative assessments) can be part of the information displayed about each driver. This enables drivers to be wary of those on the road with strongly negative community assessments, and also encourages better behavior on the roads due to the natural inclination for drivers to want to be perceived positively by peers.

In the following description, for purposes of explanation, numerous examples and specific details are set forth in order to provide a thorough understanding of the present disclosure. It will be evident, however, to one skilled in the art that the present disclosure as expressed in the claims may include some or all of the features in these examples, alone or in combination with other features described below, and may further include modifications and equivalents of the features and concepts described herein.

Figure 1:
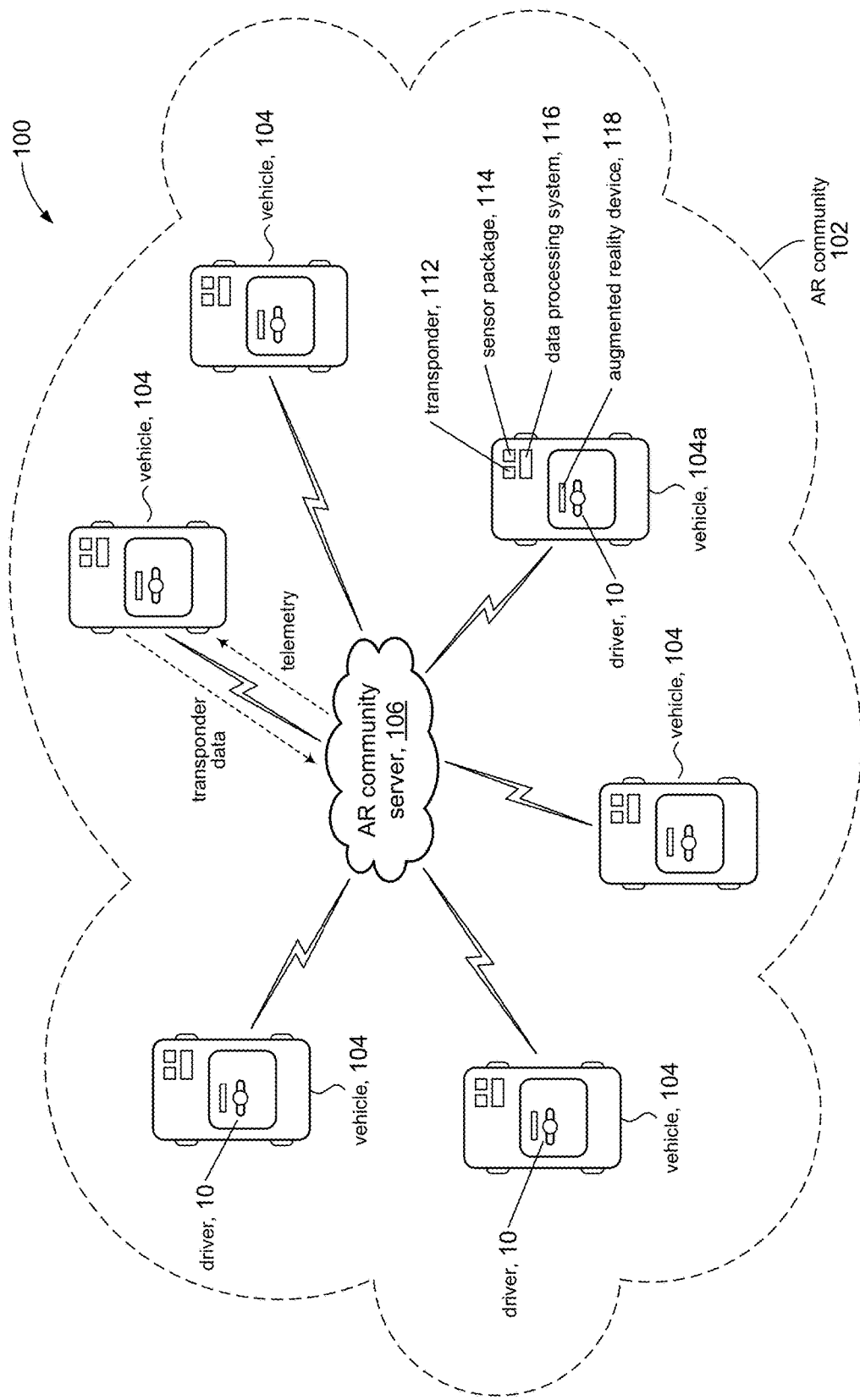
FIG. 1 depicts a simplified diagram of an augmented reality (AR) system according to certain embodiments.

FIG. 1 shows an AR based system 100 in accordance with embodiments of the present disclosure. The system 100 enables and supports an AR-based social community 102 of drivers 10. Drivers' vehicles 104 include, but are not limited to passenger vehicles (cars, trucks, motorcycles), recreational vehicles, commercial vehicles, public transportation vehicles (e.g., buses, cabs), and so on.

Vehicles 104 in accordance with the present disclosure can be equipped with various instrumentation. In some embodiments, for example, the instrumentation package in a given vehicle 104a can include a transponder 112 to provide information about the vehicle 104a and its status. A sensor package 114 can include a radar and/or lidar (light detection and ranging) system to detect the presence of nearby vehicles 104. The sensor package 114 can include a system of cameras to provide a 360° perception of the vehicle's physical surroundings and correlate with the driver's own visual observations and inputs. A data processing system 116 can provide data processing of information provided by the transponder 112 and sensor package 114. An AR device 118 can operate in conjunction with the data processing system 116 to provide the driver 10 with an augmented reality experience in accordance with the present disclosure.

The system 100 can include an AR community server 106 to support interaction among drivers 10 in the community 102. The server 106 can receive transponder data from each of the transponders 112; for example, the transponder 112 can include a transceiver unit (not shown) to communicate with the server 106. In some embodiments, the transponders 112 can always be active; e.g., each transponder 112 can periodically transmit (ping) their data to the server 106 whenever the vehicle 104 is running. This allows the server 106 to have the most up to date information of vehicles 104 in the community 102. The transponder data received from the vehicles 104 can be collected and processed by the server 106. The server 106 can repackage the received and processed transponder data and transmit it to a given vehicle (e.g., 104a) as telemetry that describes the state of the other vehicles 104 nearby the given vehicle 104a.

Vehicles 104 providing transponder data to the server 106 can be anywhere in a given geographic region. Telemetry for vehicles 104 in one part of town, therefore, may not be relevant to drivers at the other side of town. In accordance with the present disclosure, the server 106 can implement a subscribe/publish service. Drivers can subscribe to a particular feed, for example, based on their local geographical location. The server 106 can then provide telemetry only for those vehicles 104 in the immediate vicinity of the driver.

Figure 2:
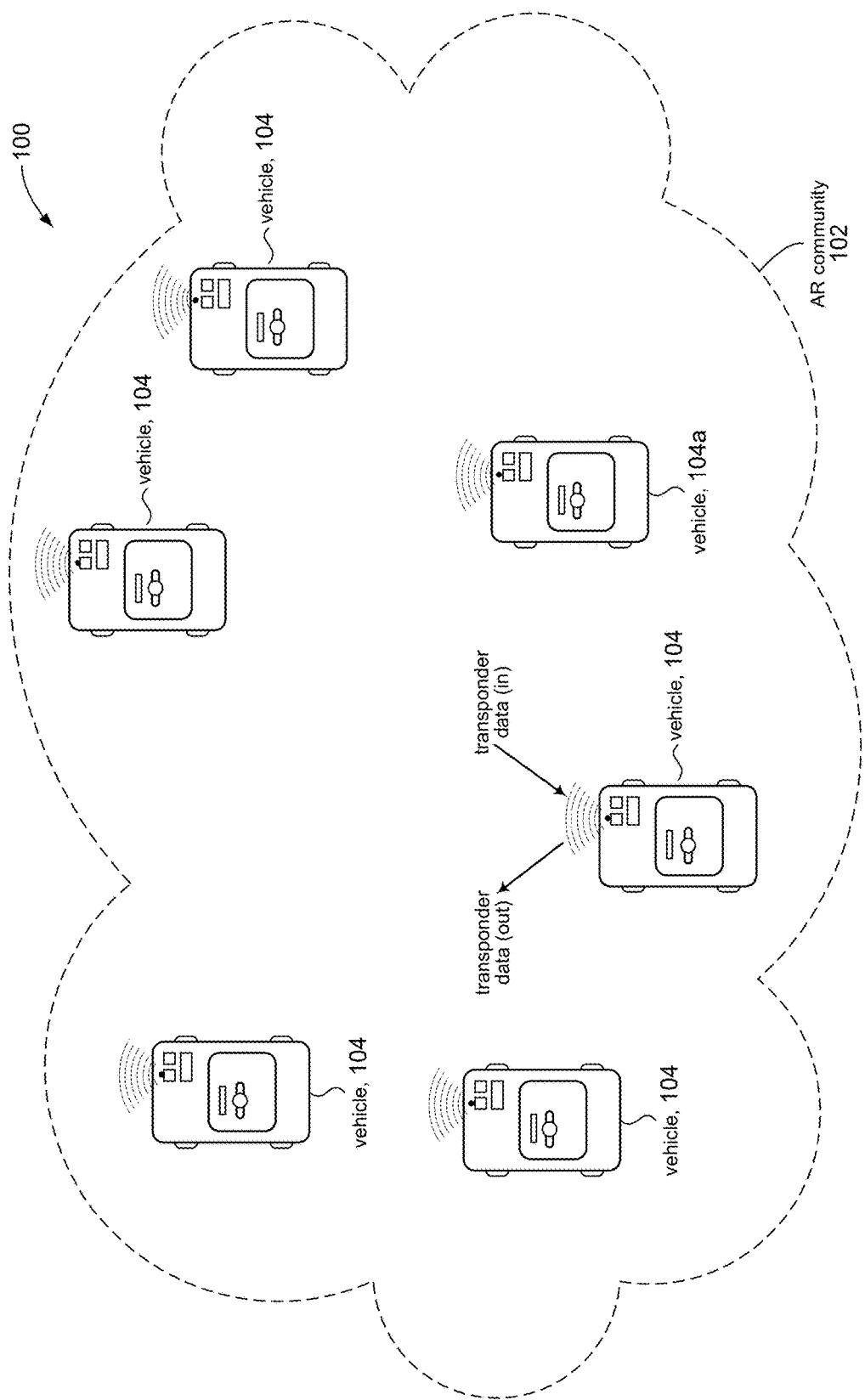
FIG. 2 depicts a simplified diagram of an alternate configuration of an AR system according to certain embodiments.

The AR community server 106 shown in FIG. 1 provides a data infrastructure for the exchange of data (e.g., transponder data, telemetry) among vehicles 104 in the community 102. FIG. 2 shows, for some embodiments, that the data exchange can occur directly among the vehicles 104 themselves, without a server. In some embodiments, for example, each transponder 112 can use a radio frequency to broadcast its transponder data to other transponders in its immediate area, and conversely can receive broadcasts from other transponders. In some embodiments, for example, communication can be based on a packet switched radio network. It will be appreciated that the data processing functionality provided by the AR community server 106 can be distributed among the vehicles 104. The remaining discussion will assume, without loss of generality, a configuration that includes the AR community server 106.

Figure 3:
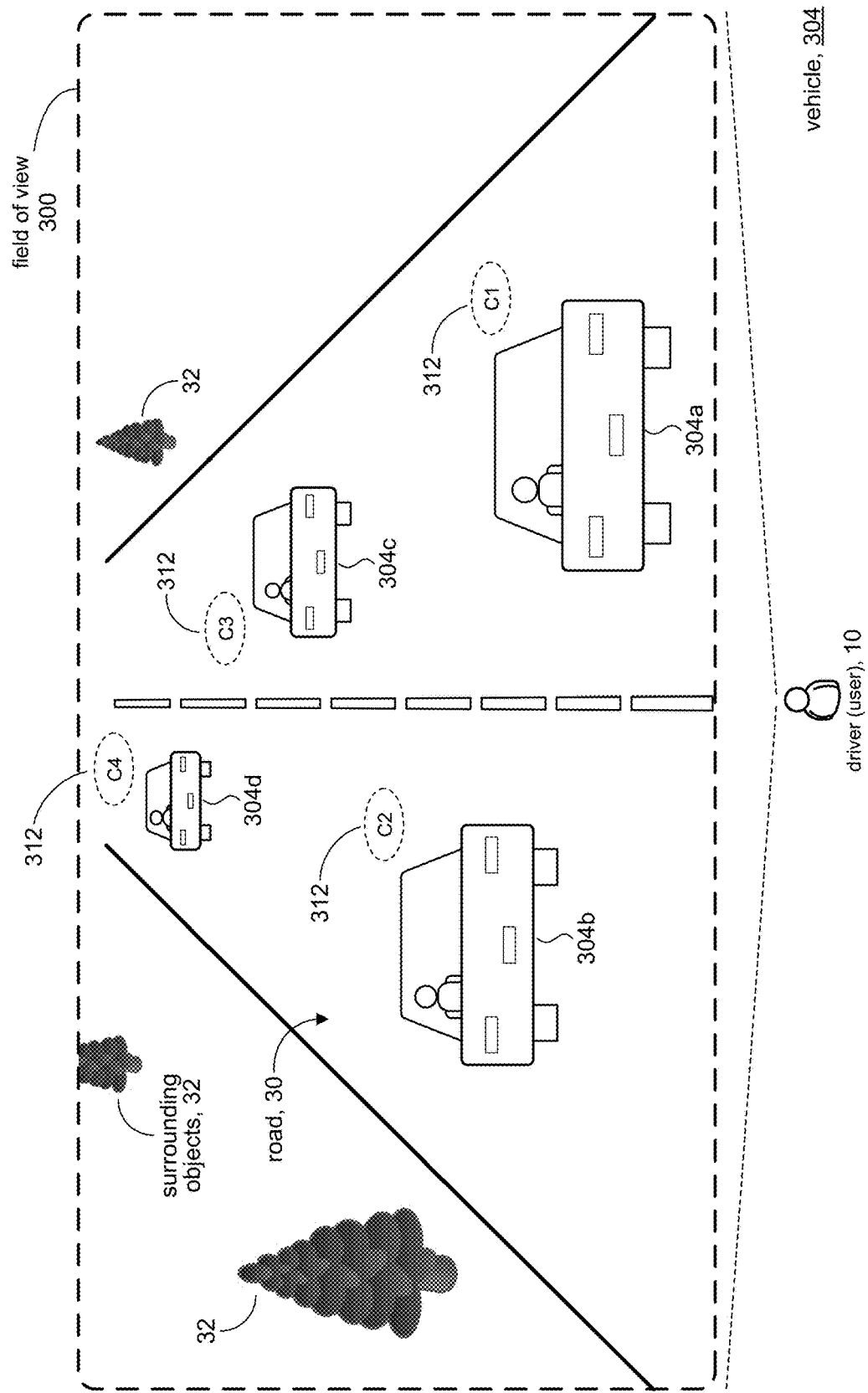
FIG. 3 is an illustrative example of an augmented reality scene.

Referring to FIG. 3, the discussion will now turn to a description of various aspects of an augmented reality experience in accordance with the present disclosure. FIG. 3 diagrammatically represents a field of view 300 as seen through the AR device 118 by a driver/user 10 of the AR device 118 in vehicle 304. The term "user" will be used to distinguish between other drivers on the road and the user 10 (who is also a driver) wearing the AR device 118. The user's field of view 300 includes the real-world objects of the user's surroundings. For example, this can include the real-world vehicles 304a, 304b, 304c, 304d that are nearby the user's vehicle 304. The real-world objects in the user's field of view 300 can also include the road 30 and other objects 32 (e.g., trees, buildings, etc.) in the user's real-world surroundings.

In accordance with the present disclosure, vehicles 304a, 304b, 304c, 304d as seen in the user's field of view 300 can be augmented with virtual objects that are displayed by the AR device 118 and superimposed on the vehicles 304a, 304b, 304c, 304d. Virtual objects are depicted in the figures using dashed or broken lines to distinguish from real-world objects which are shown using solid lines. FIG. 3, for example, shows the vehicles 304a, 304b, 304c, 304d are augmented with corresponding crowd-source indicators (vehicle indicia) 312.

Figure 4:
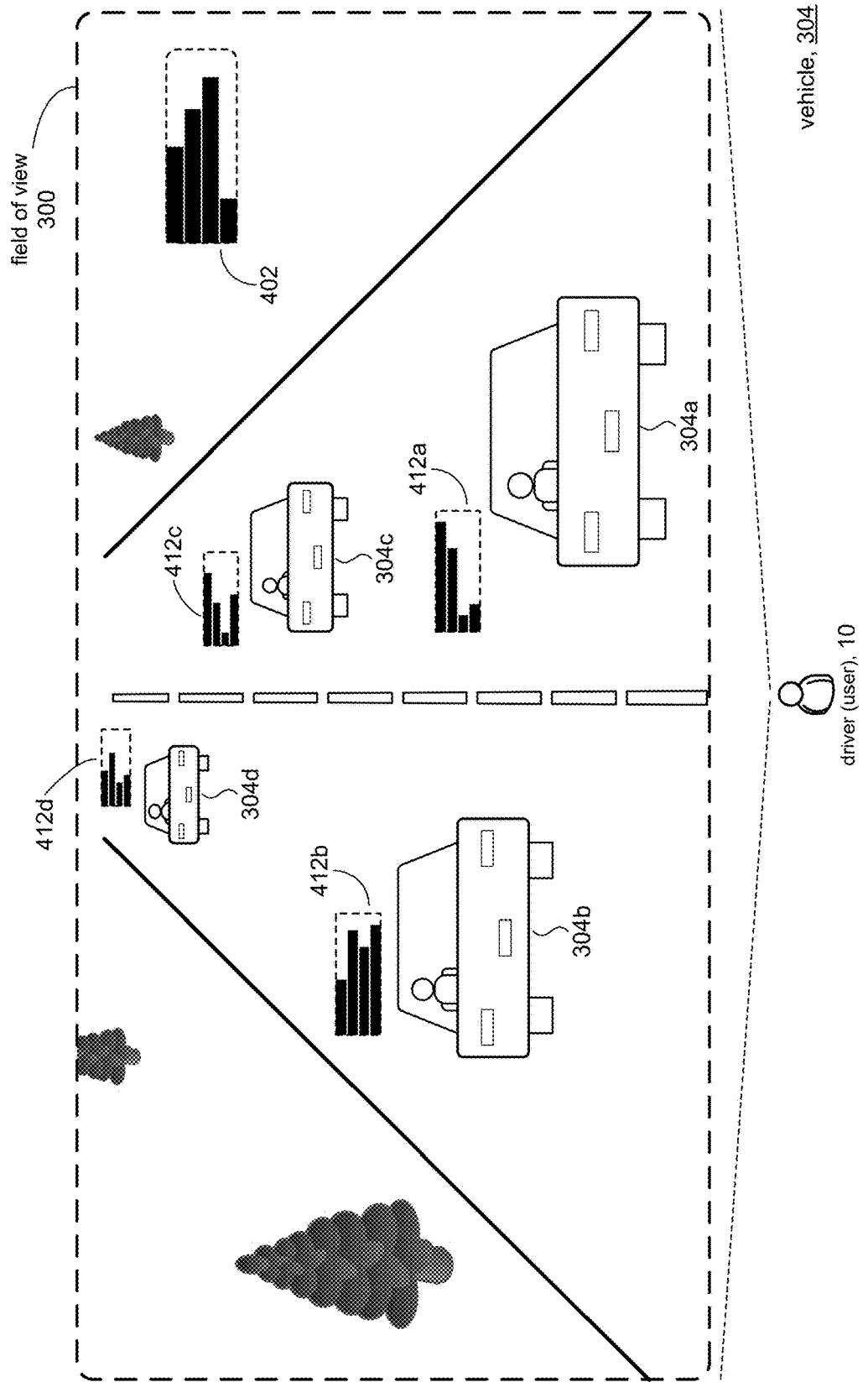
FIG. 4 is an illustrative example of an augmented reality scene in accordance with the present disclosure.

In accordance with the present disclosure, crowd-sourced indicators 312 represent information that is generated from the collective inputs of other drivers in the community 102. FIG. 4 illustrates an example of virtual crowd-sourced indicators 412a, 412b, 412c, 412d (collectively 412), respectively associated with each vehicle 304a, 304b, 304c, 304d and displayed in the user's field of view 300. Crowd-sourced indicators 412 can represent driving behaviors. Driving behavior can refer to any aspect of driving as perceived by other drivers on the road. Merely to illustrate, and by no means exhaustive, examples of driving behaviors can include driver aggressiveness, driver politeness, driver risk-taking, quality of driving, and so on.

Crowd-sourced indicators 412 can be used to rate driving behaviors of a driver based on individual assessments made by other drivers in the community 102. The crowd-sourced indicators 412 can represent a cumulative assessment of a driver's behavior. For example, the cumulative assessment can represent a driver's level of aggression, how polite the driver is to other drivers on the road, how risky the driver is, how well the driver is driving, and so on. In some embodiments, for example, individual drivers can assess various behavior by casting votes based on what they see a particular driver doing. For example, a driver may cast an "up" vote if they feel that the target driver is behaving well with respect to a given behavior. Conversely, a driver can cast a "down" vote if they feel the target driver is behaving badly. The individual votes or ratings can be collected and used to generate an overall cumulative assessment for a given behavior.

The illustrative example of crowd-sourced indicators 412 shown in FIG. 4 uses bar charts to rate various driving behaviors. Each bar in a bar chart (e.g., crowd-sourced indicators 412a), for example, can correspond to a certain behavior. As drivers vote or otherwise submit their assessments on a driver's behavior, the corresponding bar of that driver's bar chart can lengthen or shorten to reflect changes in the community's cumulative assessment of the behavior. It will be appreciated that the crowd-sourced indicators 412 can represent any one behavior or set of behaviors. It will be appreciated that the crowd-sourced indicators 412 can be presented in any suitable manner; e.g., using different chart types (e.g., pie chart), using text, using sound (in addition to or instead of visual objects), and so on.

Since the cumulative assessments (ratings) are based on the cumulative votes of many drivers, an individual driver is not likely to be able to skew the ratings with a strong negative or strong positive vote. For example, a single strong vote can be averaged out by the other votes. Also, since the cumulative assessments are based on the community 102 of drivers, the voting can be reflective of different perceptions among drivers of what is considered good behavior and bad behavior, and so the ratings can be an accurate reflection of how well a driver is doing. These cumulative assessments allow drivers to be wary of those on the road with strongly negative community assessments, and can encourage better behavior on the roads due to the natural inclination for people to want to be perceived positively by peers.

FIG. 4 further illustrates that, in accordance with the present disclosure, an individualized virtual crowd-sourced indicator 402 for the user 10 can be presented via the user's AR device 118. Like the vehicle crowd-sourced indicators 412, the user's crowd-sourced indicator 402 can represent the cumulative assessments of the user's driving behaviors as assessed by other drivers in the community 102.

Figure 4A:
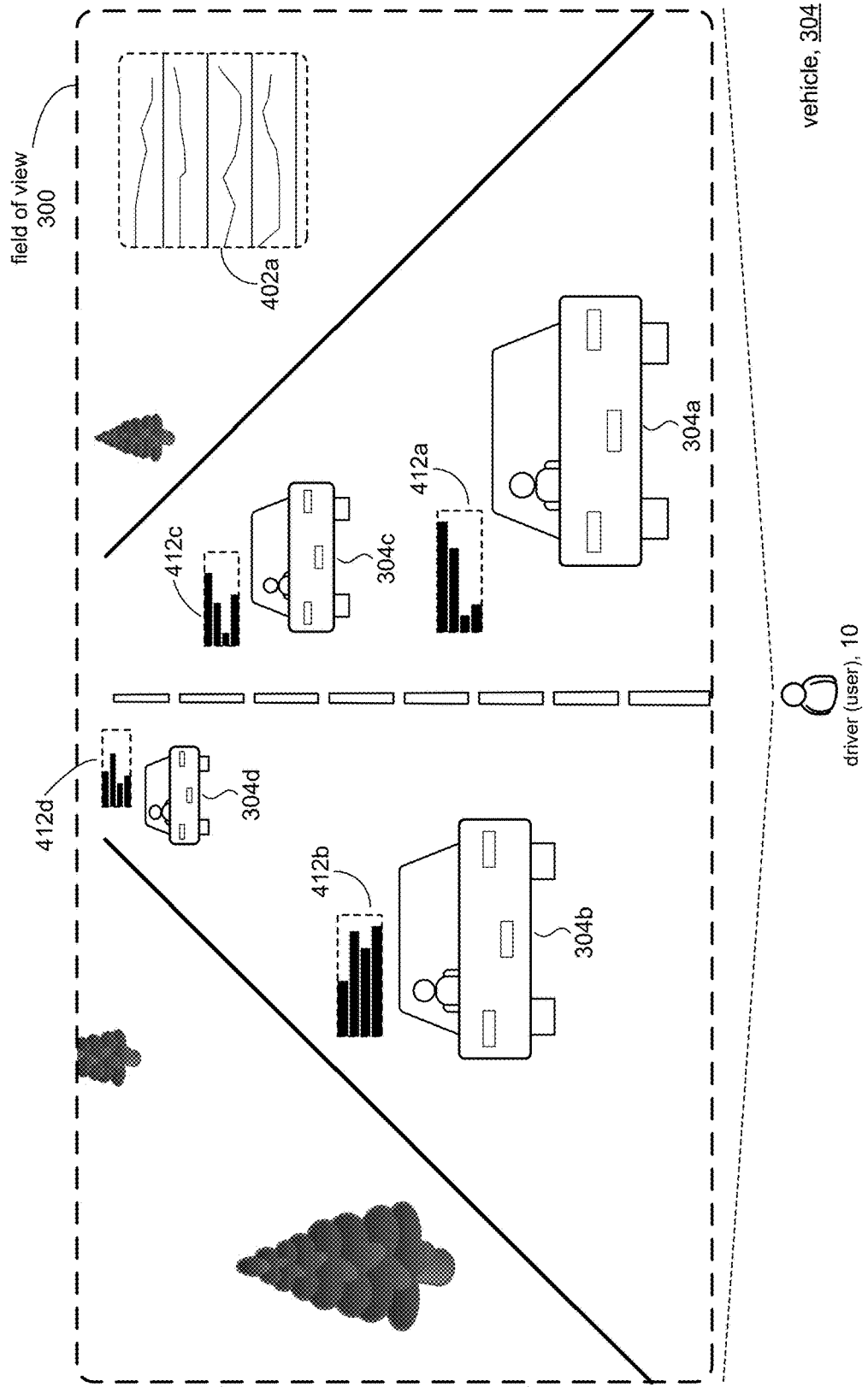

The user's crowd-sourced indicator 402 can be presented in a suitable position in the user's field of view 300. The user's crowd-sourced indicator 402 can include more and/or different information than crowd-sourced indicators 412. More detailed information can be presented if there is sufficient space in the user's field of view 300 to display the additional information without obstructing the user's view of the road or otherwise impacting driving safety. The user 10 may benefit from the additional and/or different information. Referring to FIG. 4A merely as an example to illustrate the point, instead of displaying the current cumulative assessment for a given behavior, for example, the user's crowd-sourced indicator 402 can comprise a graph 402a or some other suitable representation of previous ratings to indicate improvement in driving behavior (which can serve as positive reinforcement of the behavior) or deterioration in driving behavior (which can trigger a change in the behavior).

Figure 4B:
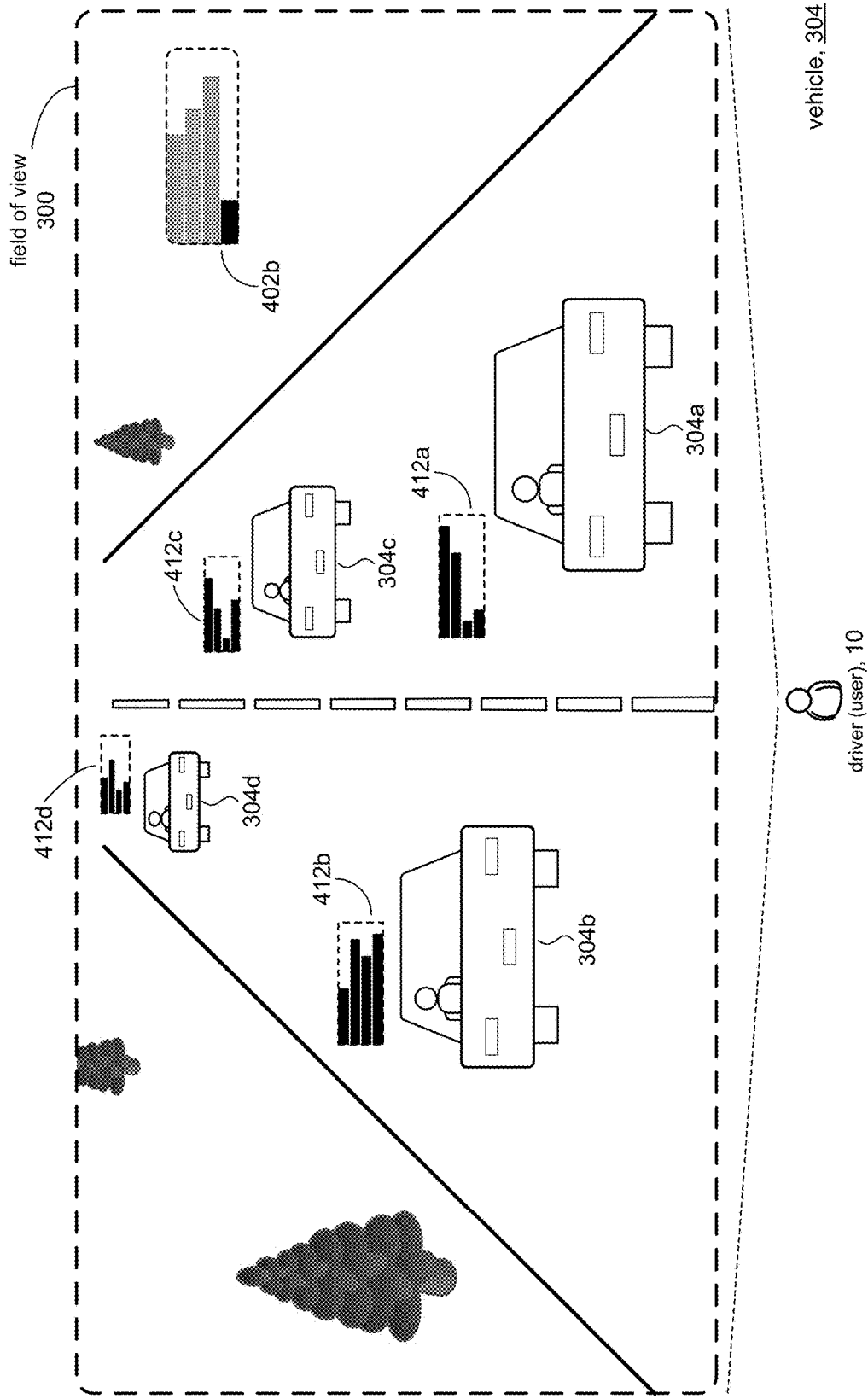

In accordance with some embodiments, the visual presentation of the user's crowd-sourced indicator 402 can vary depending the voting pattern by the other drivers. For example, attributes such as font, size, color, flashing, and so on of the text and/or graphical elements comprising the user's crowd-sourced indicator 402 can be varied. Altering the attributes of the graphic can serve to capture the user's attention. For example, if a threshold number of other drivers give the driver a negative assessment, that fact can be conveyed to the user 10. FIG. 4B illustrates an example. Here, one of the bars in the user's crowd-sourced indicator 402b is highlighted to show that the user 10 has reached a strong a negative assessment by the other drivers. This can alert the user 10 to that fact, which may encourage the user 10 alter their driving behavior.

In some embodiments, an entirely different graphic can be presented, rather than simply altering an attribute of the graphic, to alert the misbehaving user 10. Referring to FIG. 4C, for example, suppose a large number of drivers voted that the user 10 is driving erratically, the user's crowd-sourced indicator 402 can change from the bar chart format shown in FIG. 4 to an explicit warning 402c as shown in FIG. 4C. Generally, the user's crowd-sourced indicator 402 can be presented in any manner to indicate a certain voting pattern.

Figure 5B:
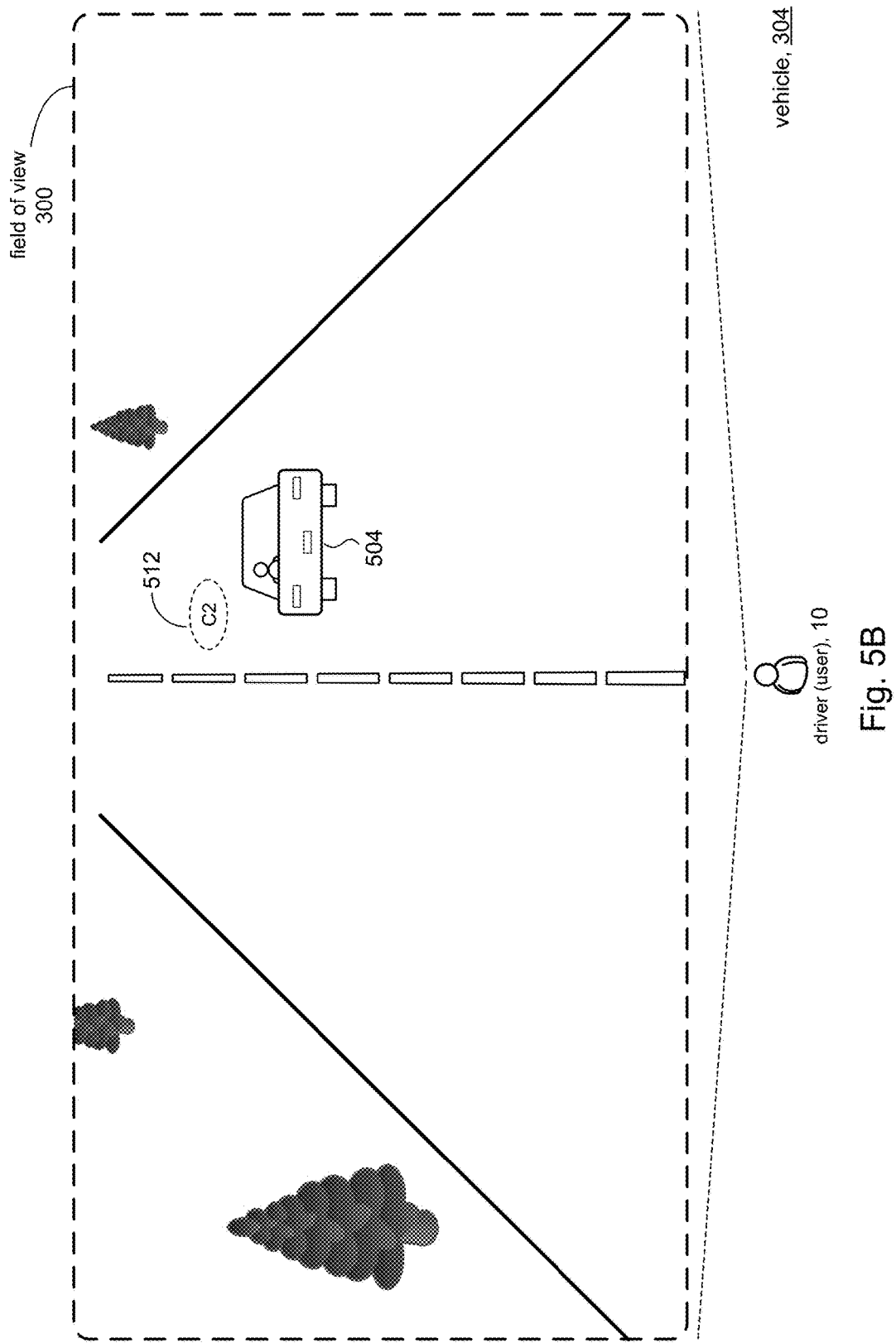

Referring to the sequence in FIGS. 5A, 5B, and 5C, in accordance with the present disclosure, the crowd-sourced indicator 512 can be displayed in registration with the corresponding vehicle 504 as the vehicle's position in the user's field of view 300 changes while traveling on the road. This allows the crowd-sourced indicator 512 (virtual object) to track with the vehicle 504 (real-world object) in the user's field of view 300. As can be seen in the sequence, the position of the crowd-sourced indicator 512 can change as the vehicle's position changes. Also, as the distance between the user 10 and the vehicle 504 changes, the size of the crowd-sourced indicator 512 can change accordingly; e.g., size increases as the distance decreases and size decreases as the distance increases.

Figure 6:
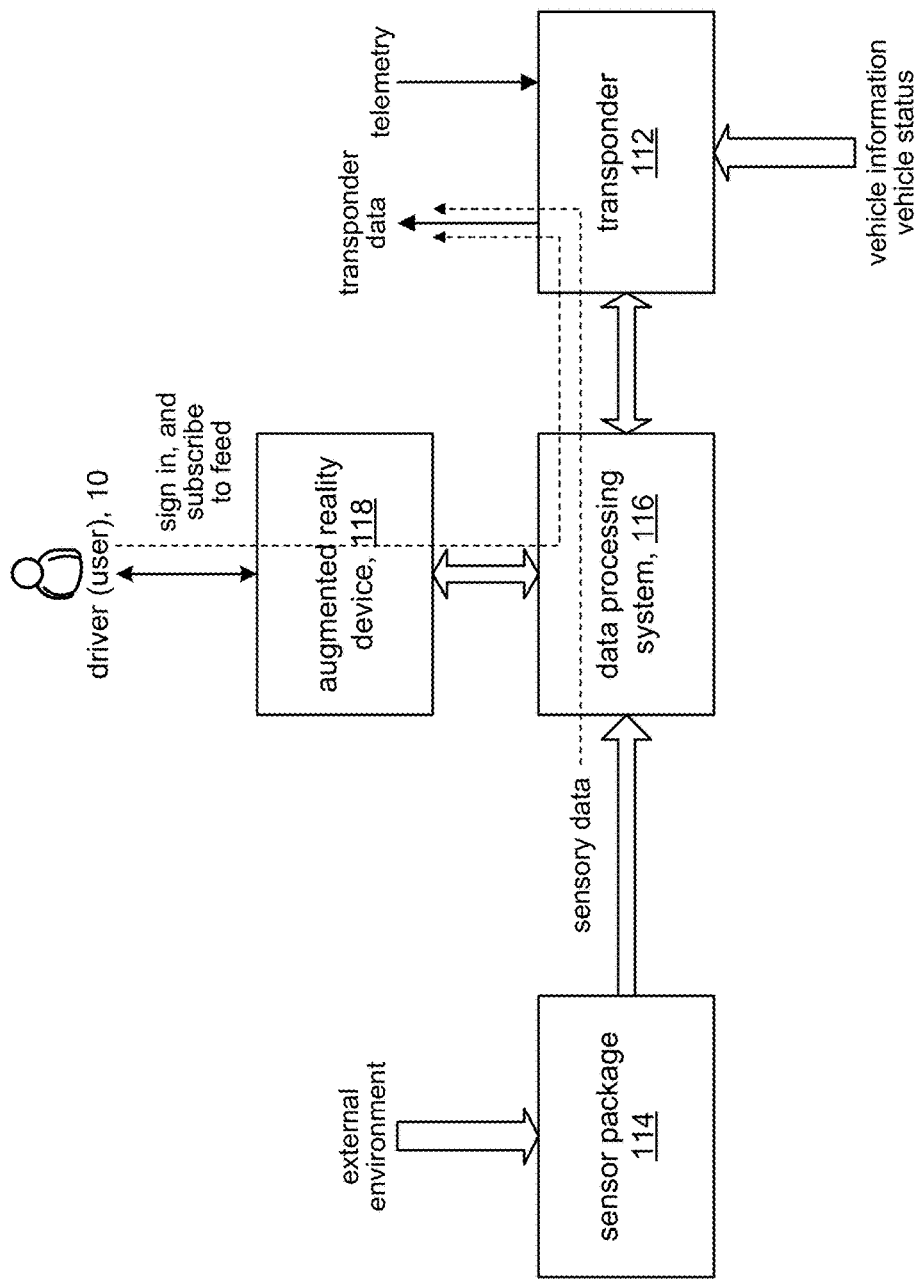
FIG. 6 shows details of an instrumentation package in an AR system according to certain embodiments.

FIG. 6 shows additional detail of the instrumentation package shown in FIG. 1 that can be provided in each vehicle 104 in accordance with the present disclosure. For example, in a given vehicle 104a, transponder 112 can generally provide information about the vehicle itself. In some embodiments, for example, the transponder 112 can store information that identifies the vehicle 104a; e.g., the make and model of the vehicle, license number, and so on. The transponder 112 can be integrated with the vehicle's systems to provide information about the status of the vehicle 104a. Status information can include attributes of the engine (e.g., engine temp., oil level, fuel level, etc.), speed of the vehicle 104a, the vehicle's acceleration (gas pedal)/deceleration (brake pedal) state, and the like. The transponder 112 can include a GPS component to provide information about the vehicle's location. Information from the transponder 112, collectively referred to as "transponder data," can be transmitted to the AR community server 106. In addition, the transponder data can be provided to the data processing system 116 and processed locally to support functionality in the AR device 118. The transponder 112 can be used to allow the user to sign-in to the AR community server 106 and to subscribe to feeds for information on other drivers on the road.

In accordance with the present disclosure, the sensor package 114 in a given vehicle 104a can provide sensory data about the vehicle's external environment. In some embodiments, for example, the sensor package 114 can include a radar and/or lidar system to detect the presence of nearby vehicles 104, and generate radar and/or lidar data that represents other vehicles' positions relative to each other and to the given vehicle 104a. The radar and/or lidar data can include information about other vehicles' speeds relative to each other and to the given vehicle 104a, and the like. The sensor package 114 can include a system of cameras to record a 360° view around the vehicle 104a to provide a source of visual information (e.g., video feeds) of the vehicle's surroundings, including other vehicles 104 (e.g., their color, make and model, etc.), nearby structures, road conditions, etc. The radar and/or lidar data, video feeds, and any other data collected by the sensor package 114 can be provided to the data processing system 116 and processed locally to support the AR device 118. In some embodiments, some of the sensory data can be incorporated with the transponder data and provided to the AR community server 106.

The data processing system 116 can serve as the central data processing unit in the vehicle 104a to process transponder data from the transponder 112 and sensory data from the sensor package 114. The data processing system 116 can also provide the human-machine interaction with the AR device 118 to provide the driver 10 with an augmented reality experience in accordance with the present disclosure.

Figure 7:
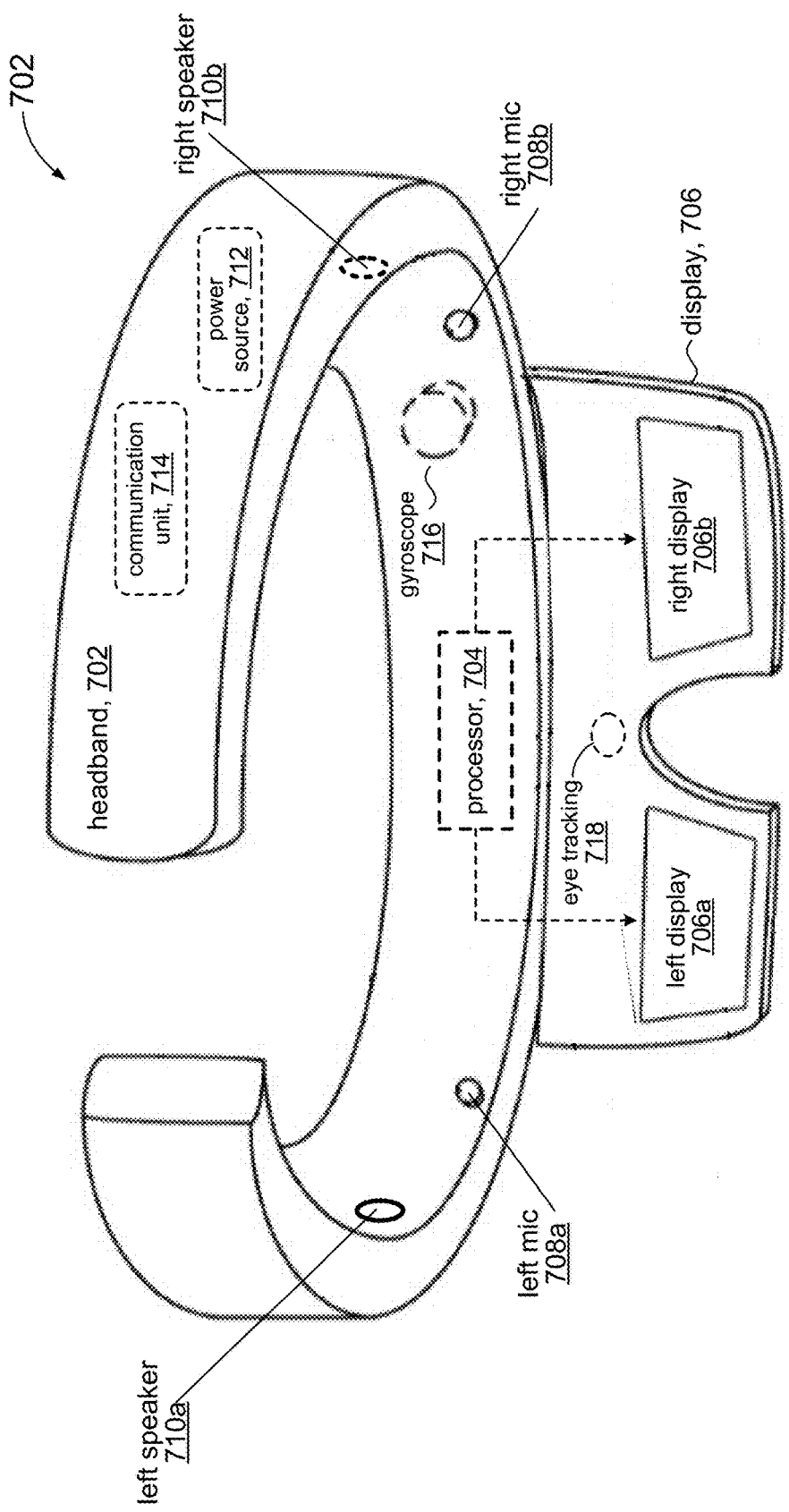
FIG. 7 shows an example of a wearable AR device.

FIG. 7 illustrates an AR device 118 in accordance with the present disclosure. In some embodiments, for example, the AR device 118 can take the form of a wearable device. Different wearable form factors include goggles, glasses, and the like. In other embodiments (not shown), the AR device can be a heads up display system (HUDS) that is integrated with the vehicle's windshield to project virtual objects onto the vehicle's windshield. A HUDS AR device can additionally project virtual objects onto the user's passenger-side window. A HUDS AR device can include a head position sensor and eye tracking sensor to provide information about the user's head position and eye movements to provide registration of virtual objects with vehicles in the user's field of view (e.g., 300, FIG. 3). The present disclosure will assume, without loss of generality, a wearable AR device 118.

The AR device 118 can include a headband 702 that allows the user 10 to wear the device. The headband 702 can be adjustable to provide a suitable fit for the user 10. The headband 702 can house various components comprising the AR device 118, including a power source 712 and a communication unit 714; e.g., to provide wireless communication with data processing system 116.

The AR device 118 can include a processor 704, which among other things, can generate and display virtual objects (e.g., crowd-source indicators 402, 412) to the user 10 on a display 706. In some embodiments, the display 706 can be partially transparent so that the user 10 can view their real-world surrounding through the display 706. The display 706 can comprise a left display panel 706a and a right display panel 706b. The left and right display panels 706a, 706b can be implemented using any suitable technology; e.g., using transparent organic light emitting diodes (OLED), edge-mounted light modulators, and so on.

Virtual objects displayed or presented on the display 706 are visually superimposed onto the user's field of view 300 such that the virtual objects appear with the real-world objects as shown, for example, in FIGS. 3 and 4. The left and right display panels 706a, 706b can provide a stereoscopic effect for 3-dimensional virtual objects so as to visually place the virtual objects at a desired depth by presenting separate images of the virtual objects in the left and right display panels 706a, 706b.

The AR device 118 can include left and right microphones 708a, 708b for receiving spoken input from the user 10; e.g., for voice commands. In some embodiments, it may be sufficient to have only a single microphone. The AR device 118 can include left and right speakers 710a, 710b to provide stereo audio to the user 10, although in some embodiments, only a single speaker may be sufficient.

In accordance with the present disclosure, the AR device 118 can include sensors such as a gyroscope 716 to provide information about the user's head position, such as lateral position, tilt, rotation and so on. Another sensor can include an eye tracking sensor 718 to track the user's eye movements. As will be discussed below, these position sensors 716, 718 can be used to provide registration of virtual objects with vehicles as the vehicles move in the user's field of view 300.

Figure 8:
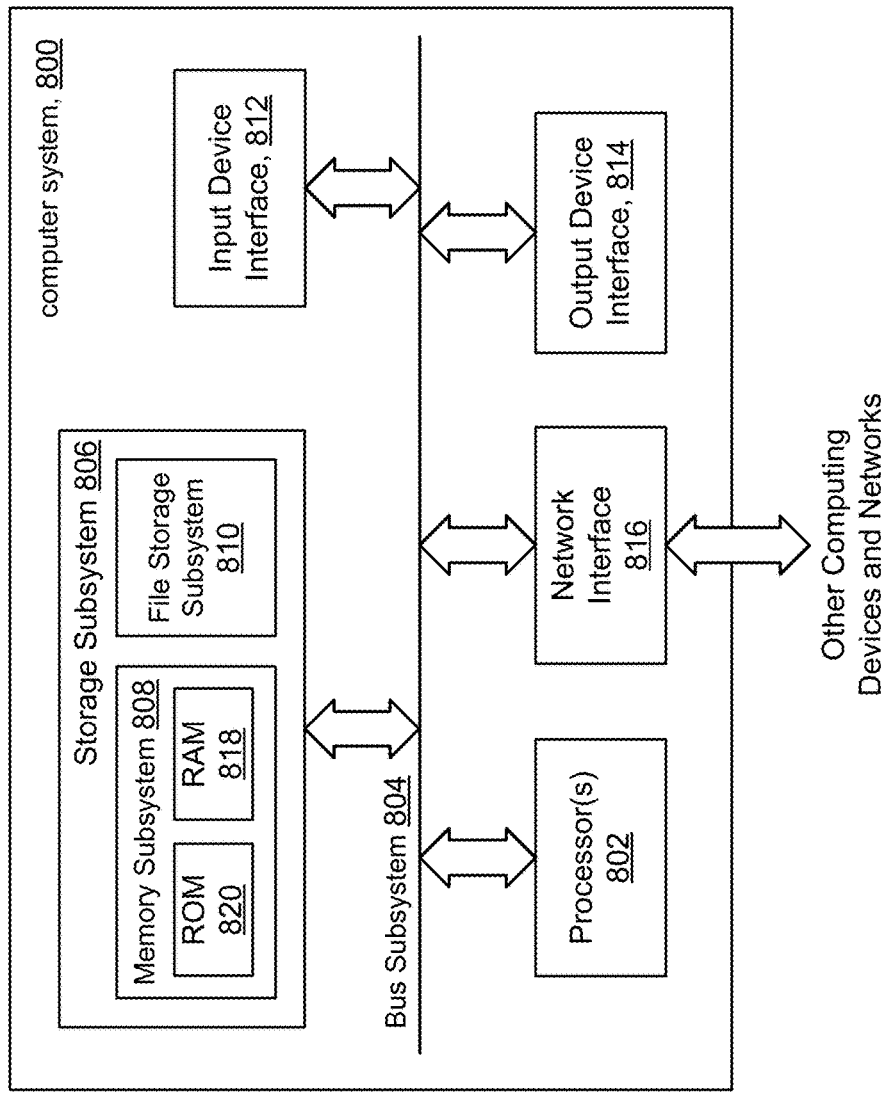
FIG. 8 depicts a simplified block diagram of an example computer system according to certain embodiments.

FIG. 8 depicts a simplified block diagram of an example computer system 800 according to certain embodiments. Computer system 800 can be used to implement any of the computing devices, systems, or servers described in the present disclosure, including for example the AR community server 106, data processing system 116, and processor 704 in the AR device 118.

As shown in FIG. 8, computer system 800 includes one or more processors 802 that communicate with a number of peripheral devices via a bus subsystem 804. These peripheral devices include a storage subsystem 806 (comprising a memory subsystem 808 and a file storage subsystem 810, an interface 812 for input devices, an interface 814 for output devices, and a network interface subsystem 816.

Bus subsystem 804 can provide a mechanism for letting the various components and subsystems of computer system 800 communicate with each other as intended. Although bus subsystem 804 is shown schematically as a single bus, alternative embodiments of the bus subsystem 804 can utilize multiple busses.

Network interface subsystem 816 can serve as an interface for communicating data between computer system 800 and other computer systems or networks. Embodiments of network interface subsystem 816 can include for example, a WiFi transceiver, cellular adapter, wireless modem (satellite, packet-switched radio, etc.), and/or the like. The network interface subsystem 816 in both the data processing system 116 and the processor 704 of the AR device 118, for example, can use wireless communication technology to communicate with each other.

The interface 812 can connect to audio input devices such as the microphones 708a, 708b in the case of AR device 118. The interface 814 can connect to output devices such as the display 706 in AR device 118.

Storage subsystem 806 includes a memory subsystem 808 and a file/disk storage subsystem 810. Subsystems 808 and 810 represent non-transitory computer-readable storage media that can store program code and/or data that provide the functionality of embodiments of the present disclosure.

Memory subsystem 808 includes a number of memories including a main random access memory (RAM) 818 for storage of instructions and data during program execution and a read-only memory (ROM) 820 in which fixed instructions are stored. File storage subsystem 810 can provide persistent (i.e., non-volatile) storage for program and data files, and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that computer system 800 is illustrative and many other configurations having more or fewer components than system 800 are possible.

Figure 9A:
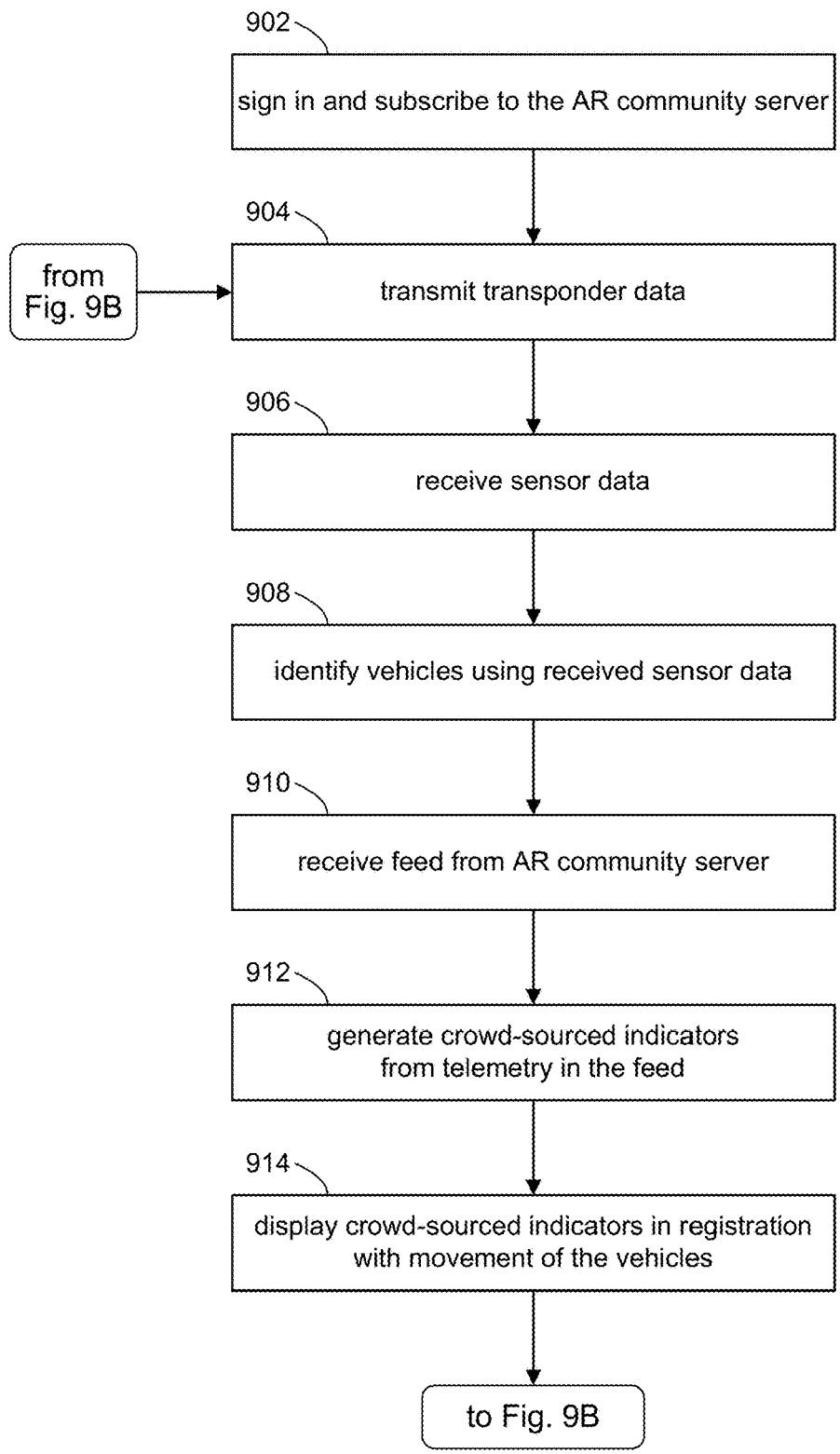
FIGS. 9A and 9B show operations and processing in an AR system according to certain embodiments.
Figure 9B:
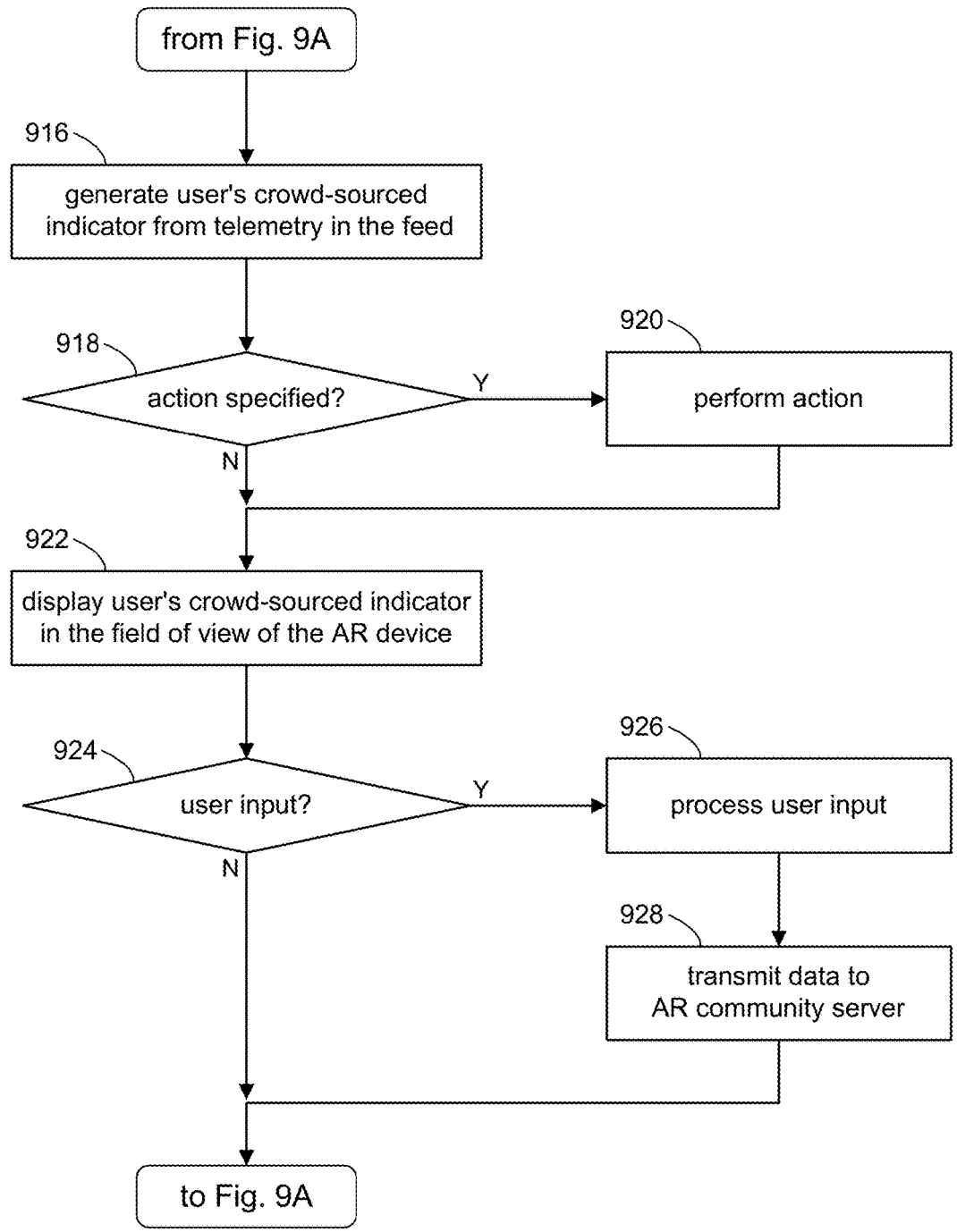

Referring to FIGS. 9A and 9B and other figures, the discussion will now turn to a high level description of operations and processing by the instrumentation package in a vehicle 104, including the computer system 116 and AR device 118, to provide an augmented reality experience in accordance with the present disclosure. In some embodiments, for example, the computer system 116 and AR device 118 can include computer executable program code, which when executed by their respective processors (e.g., 802, FIG. 8), can cause the computer system 116 and AR device 118 to perform processing in accordance with FIGS. 9A and 9B. The operation and processing blocks described below are not necessarily executed in the order shown, and can be allocated for execution among one ore more concurrently executing processes and/or threads.

At block 902, a user 10 can sign-in to the AR community server 106 so that the user can be identified. In some embodiments, the sign-in process can ensure anonymity, for example, by using anonymous ID. This allows the AR community server 106 to announce the user's presence to the community 102 without revealing who they are. The sign-in can include a password or other authentication sequence so to ensure the ID, although anonymous, is used by the same user 10.

Once signed in, the user 10 can subscribe to a feed to receive local telemetry from the AR community server 106. The telemetry is "local" in the sense that the telemetry is for vehicles near the user's location. The AR device 118 can receive spoken commands from the user 10 to request a feed from the AR community server 106, including identifying information that can be used to identify the user 10. In some embodiments, the AR device 118 can perform voice recognition processing to convert the speech to equivalent text. The generated text can be sent in a subscribe-to-feed request (e.g., via computer system 116) to the AR community server 106. In other embodiments, the AR device 118 can transmit the spoken speech to the computer system 116, which can then perform the conversion. In some embodiments, the computer system 116 can transmit the spoken speech to the AR community server 106 to process the spoken speech. The request can be sent to the AR community server 106 along with the transponder data, as depicted in FIG. 6 for example.

At block 904, the transponder 112 in the user's vehicle can continuously (e.g., periodically) transmit transponder data to the AR community server 106. The transponder data includes status information and location information (e.g., GPS coordinates) for the user's vehicle. The transponder 112 can provide some of the transponder data (e.g., GPS coordinates of the user's vehicle) to the computer system 116 for local processing.

At block 906, the computer system 116 can receive sensor data from the sensor package 114. As explained above, the sensor data can provide information about the external surroundings of the user's vehicle, including radar and/or lidar data and video feeds, that can provide information about vehicle near the user's vehicle.

At block 908, the computer system 116 can use the sensor data to identify vehicles in the user's vicinity. For example, the computer system 116 can include a computer vision system and image processing capability to recognize the presence of vehicles in the video feeds contained the sensor data. The computer system 116 can include recognition software to identify vehicles by make and model, their color, and so on. The positions of identified vehicles relative to the user's vehicle can also be determined; e.g., in front of, to the right, to the left, behind, etc.

At block 910, the computer system 116 can receive a feed from the AR community server 106 (block 902). The feed can include telemetry for the vehicles near the user 10. For example, the telemetry can include the location information (e.g., GPS coordinates) of each vehicle, information that identifies the drivers of the vehicles, and so on. In accordance with the present disclosure, the telemetry can include cumulative assessments data, described above in connection with FIG. 4, associated with the drivers in each vehicle. The telemetry can further include cumulative assessment data associated with the user 10.

At block 912, the computer system 116 can generate crowd-sourced indicators (e.g., 412) for vehicles identified in the received telemetry. The telemetry can include the cumulative assessments of one or more driving behaviors for each vehicle. In some embodiments, the received telemetry can include graphical data for generating the indicators themselves. In other embodiments, the computer system 116 may include predefined graphics in its memory (e.g., 810, FIG. 8) that it can use to generate the indicators. The computer system 116 can use the cumulative assessments as parameters to control the generation of the indicators; e.g., the length of bars in a bar chart can be determined by the magnitude of its associated cumulative assessment.

At block 914, the computer system 116 can display the crowd-sourced indicators in registration with their respective vehicles. For example, the computer system 116 can identify the positions of the vehicles using the location information provided in the received telemetry (block 910) and the position of the user's vehicle using location information provided by the vehicle's transponder 112 (e.g., transponder data) to determine the location of each vehicle to a first approximation. The computer system 116 can use the video feeds provided by the cameras comprising the sensor package 114 to determine the specific location the vehicles in the user's field of view 300. The computer system 116 can then determine specific placement locations of the crowd-sourced indicators for each vehicle to be displayed on the AR device 118. The computer system 116 can provide this information to the AR device 118 to superimpose the crowd-sourced indicators onto the user's field of view 300. In some embodiments, the indicators can be made semitransparent so the user 10 can see the real-world objects behind indicator.

The feed continuously received from the AR community server 106 (block 910) provides up to date location information of the vehicles. Likewise, the transponder 112 provides up to date location information of the user's vehicle. In order to maintain registration of the crowd-sourced indicators with the movement of their respective vehicles, the computer system 116 can recompute updated placement locations of the crowd-sourced indicators using the up to date information to account for movement of both the user's vehicle and vehicles on the road.

The position of the user 10 within their vehicle can also factor into the computation of the placement locations of the vehicles' crowd-sourced indicators. For example, when the user 10 turns their head, the position of the crowd-sourced indicators presented on the display 706 of the AR device 118 may no longer register with the position of their corresponding vehicles; likewise, if the user's eye position varies. In accordance with the present disclosure, the computer system 116 can incorporate head position information provided by the gyroscope 716 and eye position provided by the eye tracking sensor 718 into its computation of placement locations for displaying the vehicles' crowd-sourced indicators on the AR device 118.

Continuing with FIG. 9B, at block 916, the computer system 116 can generate the user's crowd-sourced indicators (e.g., 402). In some embodiments, for example, the telemetry received from the AR community server 106 can include cumulative assessment data for the user 10, which can be used to generate the user's crowd-sourced indicators in the same manner as describe above in block 912 for vehicle indicators. In accordance with some embodiments, the computer system 116 can vary the visual appearance of the user's crowd-sourced indicators based on the cumulative assessment data. Merely as an example to illustrate this point, suppose the user's crowd-sourced indicators is represented by a bar chart. If the user's rating for a particular behavior is very low (e.g., <5 on a scale of 0-100), that can represent an extreme condition of the behavior. In response, the bar chart can be enhanced to call attention to this condition. For example, the user's crowd-source indicator 402b in FIG. 4B. can highlight the bar associated with the particular behavior. In some situations, it may be appropriate to display a completely different graphic. FIG. 4C illustrates an example in which the bar chart is replaced with a warning 402c.

Other examples of changing the visual appearance of the user's crowd-sourced indicators include using different graphics for different values or ranges of values of a given cumulative assessment. The color of the text may be set according to ranges of values of the given cumulative assessment; e.g., changing from blue to red in rainbow order. Indicators may include an audio component (e.g., a beep) that can change in tone, volume, and so on according to ranges of values of the given cumulative assessment, and so on.

At block 918, the computer system 116 can detect whether the telemetry received from the AR community server 106 includes any actions associated with the user's cumulative assessments. Processing can continue with block 920 in response to detecting the presence of one or more actions. Processing can continue with block 922 in response to detecting that there are no actions.

At block 920, the computer system 116 can perform an action associated with a user's cumulative assessment. Merely as an example to illustrate this point, suppose a vehicle was being driven in an unsafe manner indicative of an impaired driver, the computer system could take a number of actions, including warning the driver, alerting law enforcement, or—in the case of vehicles with some autonomous driving capability—pull the vehicle off the road.

At block 922, the computer system 116 can display the user's crowd-sourced indicator in the user's field of view 300. The computer system 116 can place the indicator in the user's field view 300 so as to avoid obscuring the user's view of real-world objects such as other vehicles on the road, portions of the road, and the like. In some embodiments, for example, the computer system 116 can use the sensor data (e.g., radar and/or lidar data, video feeds) to determine specific locations of the vehicles near the user and hence their location on the user's field of view 300. In some embodiments, the indicator can be made semitransparent so the user 10 can see the real-world objects behind indicator.

At block 924, the computer system 116 can receive input from the user 10 via the AR device 118. Processing can continue with block 926 in response to receiving input from the user 10. Processing can continue with block 904 (FIG. 9A) in the case where there is no input from the user 10.

At block 926, the computer system 116 can process the user's input. In a typical usage scenario, the user 10 can speak their input, which can be picked up by the microphones 708a, 708b of the AR device 118 and provided to the computer system 116. The computer system 116 can provide a human-machine interface with language processing capability so that the user 10 can interact with the system using spoken commands or word phrases.

In accordance with the present disclosure, the user 10 can express their assessment of a driver by speaking a description of the vehicle. The description can include the make, model, color, and other physical attributes of the vehicle. The description can also include the vehicle's position relative to the user's vehicle. For example, the user 10 can speak "green toyota" or "blue car on my right" and so on to identify the vehicle. The computer system 116 can process the spoken input to extract vehicle identification information and correlate that information with telemetry received from the AR community server 106 to identify the current driver of the vehicle. For example, if the user 10 says "green toyota," the computer system 116 can search the telemetry for a green Toyota and thus identify the driver. Where vehicle description may be ambiguous, the computer system 116 can also respond with questions necessary to disambiguate, such as "do you mean the green toyota on the left or the green toyota on the right?"

The computer system 116 can process the spoken input to identify words or phrases that relate to driving behavior. In some embodiments, predefined phrases can be used to identify various driving behavior. For example, predefined phrases that the user can speak can include "driver is polite," "driver is not polite," "driver is aggressive," "driver is not aggressive," "driver is swerving," and so on. The computer system 116 can recognize these phrases and generate a request to cast a vote for that behavior. Thus, for example, if the user 10 speaks "blue car on the right . . . driver is aggressive," can generate a request to cast a plus vote of the driver of the blue car in the behavior category of aggressive driving. Each driver in the community 102 can cast their individual ratings in this way, thus contributing to the community's assessment of that driver.

In some embodiments, the computer system 116 can include machine learning capability and/or artificial intelligence (AI) capability so that the user 10 can speak more naturally without having to speak predefined phrases. The AI, for example, can determine the driving behavior from the context of the spoken speech. Thus, for example, if the user 10 says "that's nice, I just saw a red convertible slowing down to let someone in from the on-ramp" can be interpreted as the driver being a polite driver, and a request to cast a plus vote for that driver in the behavior category of polite driving can be generated.

At block 928, the computer system 116 can transmit any requests for votes generated in block 926 to the AR community server 106. Processing can continue by returning to block 904 (FIG. 9A).

Figure 10:
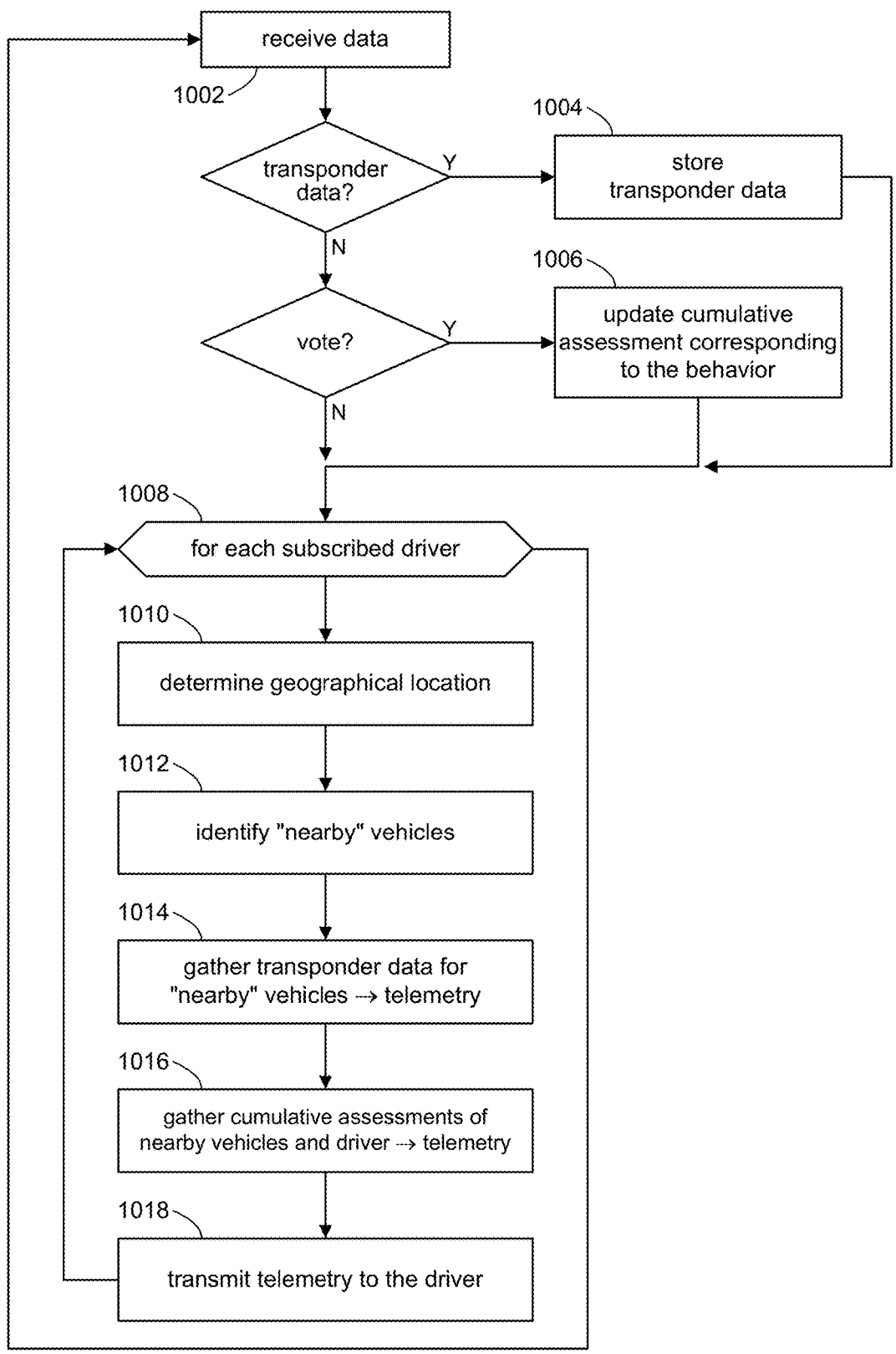
FIG. 10 shows operations and processing in a community server for an AR system according to certain embodiments.

Referring to FIG. 10 and other figures, the discussion will now turn to a high level description of operations and processing in the AR community server 106, to provide an augmented reality experience in accordance with the present disclosure. In some embodiments, for example, the AR community server 106 can include computer executable program code, which when executed by a processor (e.g., 802, FIG. 8), can cause the AR community server 106 to perform processing in accordance with FIG. 10. The operation and processing blocks described below are not necessarily executed in the order shown, and can be allocated for execution among one ore more concurrently executing processes and/or threads.

At block 1002, the server 106 can continuously receive data from each of the transponders 112 in the vehicles 104 of the community 102. The server 106 can process the received data as follows:

At block 1004, in response to the received data being transponder data, the server 106 can store the transponder data. In some embodiments, for example, the transponder data can include information that identifies the vehicle so that the data (e.g., the current location of the vehicle, it's current speed, and so on) can be stored for that vehicle. In some embodiments, when a driver subscribes to the server 106 (block 902, FIG. 9A) for a feed, the computer system 116 can incorporate a request for the feed into the transponder data (see FIG. 6). This allows the server 106 to make the association between the driver and the vehicle, thus tying the driver to that vehicle. Processing can then proceed to block 1008.

At block 1006, in response to the received data comprising a vote from a driver, the server 106 can update the cumulative assessment corresponding to the specific behavior identified in the received vote, for the driver identified in the received vote. A given cumulative assessment can be expressed as a percentage; for example, the number of positive votes as a percentage of the total number votes. The cumulative assessment can be a number that is incremented once with each positive vote and decremented once with each negative vote, and so on. In some embodiments, a particular cumulative assessment can be periodically reset to avoid including old votes that may no longer be relevant. Processing can then proceed to block 1008.

At block 1008, the server 106 can generate telemetry data for each subscribed driver as follows:

At block 1010, the server 106 can determine the subscribed driver's geographic location. As explained above, received transponder data (block 1004) can include vehicle location data (e.g., GPS coordinates). When a driver subscribes to a feed, the driver is associated with the vehicle they are driving as explained in block 1004. Therefore, the subscribed driver's geographic location can be determined from the location data contained in the transponder of the vehicle associated with that driver.

At block 1012, the server 106 can identify vehicles that are near the subscribed driver. For example, using vehicle location data, the server 106 can identify nearby vehicles. This can include vehicles that are within some distance (e.g., 100 feet) of the subscribed driver as determined based on GPS coordinates.

At block 1014, the server 106 can gather transponder data for the nearby vehicles. This can include vehicle identification information, GPS data, and so on. This information constitutes the telemetry that the server 106 sends down to the vehicles (blocks 910, 912, FIG. 9A).

At block 1016, the server 106 can gather cumulative assessments associated with the drivers of the nearby vehicles, and cumulative assessments associated with the subscribed driver. This information can be packaged with the telemetry that the server 106 sends down to the vehicles.

At block 1018, the server 106 can transmit the telemetry (feed) to the subscribed driver. The foregoing processing is repeated by returning to block 1002, in order to update the positions of each vehicle and their respective drivers and to provide updated telemetry (block 1014) and updated assessments (block 1016) in near real time for the community 102 of drivers.

Figure 11:
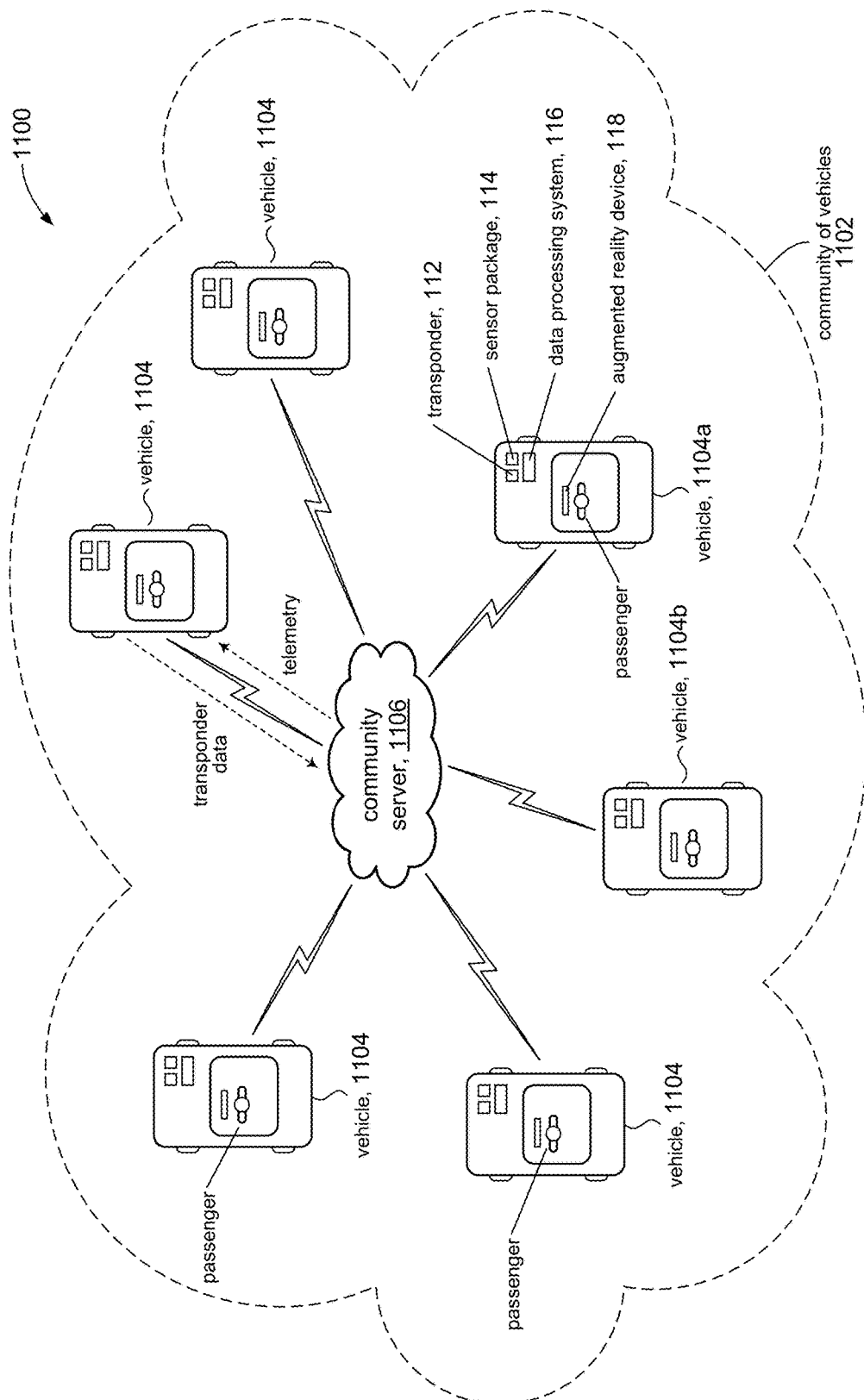
FIG. 11 depicts a community in accordance with further aspects of the present disclosure.

Referring to FIG. 11, a system 1100 in accordance with further aspects of the present disclosure can include a community 1102 comprising a "social" network of vehicles 1104 that autonomously communicate with each other. In some embodiments, for example, vehicles 1104 in the community 1102 can be driverless, autonomous vehicles, carrying passengers to their destinations. The system 1100 can include a community server 1106 to support autonomous interaction among vehicles 1104 in the community 1102.

Each vehicle 1104 can include instrumentation such as a transponder 112, sensor package 114, and a data processing system 116 as described above. An AR device 118 can operate in conjunction with the data processing system 116 to provide passengers with an augmented reality experience as there are carried by their respective vehicles 1104 to their destinations.

In some embodiments, vehicles 1104 in the community 1102 can assess each other in a manner similar to the techniques disclosed above. For example, each vehicle 1104 can "observe" other vehicles on the road via their respective instrumentation. However, instead of assessing the driving behavior of drivers (humans), the vehicles 1104 can assess driving behaviors of the actual vehicles themselves to determine if a vehicle is operating in some state of deficiency (e.g., cracked windshield, flat tire, and so on).

Processing in each of the vehicles 1104 can proceed generally as described above in connection with FIGS. 9A and 9B. For example, a given vehicle (e.g., 1104*a*) can "sign in" to identify itself (e.g., anonymously) to the community server 1106. The given vehicle can transmit data about its own condition to the community server 1106. The vehicle's instrumentation can sense the activity and condition of its surrounding vehicles, and the collected telemetric data (e.g., transponder data, sensor data, etc.) can be transmitted to the community server 1106. Telemetric data on a subject vehicle (e.g., 1104*b*) collected by the given vehicle can be viewed as an assessment of that subject vehicle.

In some embodiments, a vehicle can enhance the AR experience of a passenger wearing an AR device 118, generally in the manner as described above. Instead of displaying virtual information relating to the driving behavior of other drivers, the passenger's AR experience can be enhanced with information relating to the behavior of other vehicles on the road. The virtual information can be based on a compilation of assessments made by vehicles in the vicinity of the passenger, and can include an assessment of the passenger's vehicle in addition to other vehicles on the road.

The community server 1106 can process the individual assessments received from vehicles 1104 in the community 1102 made on a subject vehicle (e.g., 1104*b*), and take appropriate actions. For example, if the number of individual assessments that report on a given situation (e.g., low tire pressure has been observed for a subject vehicle) passes a certain threshold, the community server 1106 can take action (either automatically or with human intervention) to remediate the situation. In some embodiments, for example, the community server 1106 can send messages to the data processing system 116 of the subject vehicle with instructions to take action.

In some embodiments, for example, if the community server 1106 determines, based on other vehicles' assessments, that the subject vehicle should schedule itself for maintenance, the community server 1106 can send a message to that effect to the subject vehicle. In response, the data processing system 116 on the subject vehicle can take action autonomously and schedule itself for maintenance. Alternatively, the subject vehicle can inform the owner that the community of vehicles 1102 had made a determination that maintenance activity is appropriate. The "voice" of the community 1102 may be able to overcome the owner's propensity to procrastinate and encourage the owner to take action.

In some embodiments, the community server 1106 may even initiate physical action to be taken by the subject vehicle. For example, if the community server 1106 determines that a sufficiently dire situation (e.g., imminent danger to the passenger(s) or damage to the vehicle) exists, the community server 1106 can send a message to the subject vehicle to pull over onto a shoulder on the road. In response, data processing system 116 on the subject vehicle can autonomously take action (e.g., control the vehicle to pull over) or inform the passenger of the situation.

The community of vehicles 1102 in accordance with this aspect of the present disclosure can enable a self-healing or self-policing vehicle network, whereby autonomous vehicles have the capacity to "observe" other vehicles on the road and—similar to humans—make a judgment as to whether the other vehicles are exhibiting unsafe driving behaviors or operating in some other state of deficiency. This contributes to a defense-in-depth approach for autonomous road safety, where local, on-vehicle safety measures may fail or be insufficient to detect problems.

Accordingly, in some embodiments in accordance with the present disclosure, an AR system can include one or more computer processors in a subject vehicle on a road carrying a user of the AR system and a computer-readable storage medium comprising instructions for controlling the one or more computer processors to be operable to receive telemetry associated with a plurality of vehicles proximate the subject vehicle and augment a real-world view of the plurality of vehicles as seen by the user via the AR system.

The one or more computer processors can generate from the received telemetry vehicle indicia corresponding to the plurality of vehicles and display the vehicle indicia in registration with the real-world view of the plurality of vehicles using position information contained in the received telemetry so that the vehicle indicia move in registration with movement of their corresponding vehicles.

The one or more computer processors can display in a field of view of the AR system at least one crowd-sourced indicator, generated from the received telemetry, that represents a community assessment of the subject vehicle, the at least one crowd-sourced indicator comprising a compilation of individual assessments of the subject vehicle submitted by the plurality of vehicles.

In some embodiments, each individual assessment from each of the plurality of vehicles can be based on telemetry associated with the subject vehicle collected by said each of the plurality of vehicles.

In some embodiments, the computer-readable storage medium can further comprise instructions for controlling the one or more computer processors to perform an action on the subject vehicle based on the compilation of individual assessments of the subject vehicle submitted by the plurality of vehicles. The action can include preventing operation of the subject vehicle. The action can include forcing the subject vehicle to steer itself onto a shoulder of the road. The action includes scheduling the subject vehicle for maintenance.

The above description illustrates various embodiments of the present disclosure along with examples of how aspects of these embodiments may be implemented. The above examples and embodiments should not be deemed to be the only embodiments, and are presented to illustrate the flexibility and advantages of the present disclosure as defined by the following claims. For example, although certain embodiments have been described with respect to particular process flows and steps, it should be apparent to those skilled in the art that the scope of the present disclosure is not strictly limited to the described flows and steps. Steps described as sequential may be executed in parallel, order of steps may be varied, and steps may be modified, combined, added, or omitted. As another example, although certain embodiments have been described using a particular combination of hardware and software, it should be recognized that other combinations of hardware and software are possible, and that specific operations described as being implemented in software can also be implemented in hardware and vice versa.

The specification and drawings are, accordingly, to be regarded in an illustrative rather than restrictive sense. Other arrangements, embodiments, implementations and equivalents will be evident to those skilled in the art and may be employed without departing from the spirit and scope of the present disclosure as set forth in the following claims.

What is claimed is:

1. An augmented reality (AR) system comprising:
one or more computer processors; and
a computer-readable storage medium comprising instructions for controlling the one or more computer processors to be operable to:
receive telemetry associated with first vehicles proximate a second vehicle that is driven by a user of the AR system;
augment a real-world view of the first vehicles as seen by the user via the AR system, wherein the one or more computer processors:
generate from the received telemetry vehicle indicia corresponding to the first vehicles;
generate crowd-sourced indicators associated with the first vehicles; and
display the vehicle indicia and the crowd-sourced indicators in registration with the real-world view of the first vehicles using position information of the first vehicles from the received telemetry so that the vehicle indicia move in registration with movement of their corresponding first vehicles; and
display in a field of view of the AR system at least one crowd-sourced indicator, generated from the received telemetry, that represents a community assessment of the user of the AR system, the at least one crowd-sourced indicator comprising a compilation of individual assessments of the user of the AR system submitted by drivers among the first vehicles.

2. The AR system of claim 1, wherein the at least one crowd-sourced indicator is a rating of driving behavior of the user of the AR system and the individual assessments are individual ratings of the user's driving behavior submitted by the drivers among the first vehicles.

3. The AR system of claim 1, wherein the computer-readable storage medium further comprises instructions for controlling the one or more computer processors to receive spoken input from the user of the AR system that constitutes an assessment of a driver of one of the first vehicles.

4. The AR system of claim 3, wherein the assessment received from the user of the AR system is a rating of the driver's driving behavior.

5. The AR system of claim 3, wherein the user of the AR system identifies the driver of one of the first vehicles by describing the driver's vehicle.

6. The AR system of claim 1, wherein the at least one crowd-sourced indicator further comprises a compilation of previously submitted individual assessments of the user of the AR system.

7. The AR system of claim 1, wherein the computer-readable storage medium further comprises instructions for controlling the one or more computer processors to vary a visual appearance of the at least one crowd-source indicator according to a number of drivers among the first vehicles who have contributed to its compilation.

8. The AR system of claim 1, wherein the computer-readable storage medium further comprises instructions for controlling the one or more computer processors to track head position of the user of the AR system and display the corresponding vehicle indicia in registration with the real-world view of the vehicles based on the user's head position.

9. The AR system of claim 8, wherein the computer-readable storage medium further comprises instructions for controlling the one or more computer processors to track eye movement of the user, wherein displaying the corresponding vehicle indicia in registration with the real-world view of the vehicles is further based on the user's eye movements.

10. The AR system of claim 1, wherein the telemetry associated with the first vehicles are sent to a server, wherein the computer-readable storage medium further comprises instructions for controlling the one or more computer processors to receive the telemetry from the server.

11. The AR system of claim 1, wherein the computer-readable storage medium further comprises instructions for controlling the one or more computer processors to receive the telemetry associated with the first vehicles directly from each of the first vehicles, respectively.

12. A method in an augmented reality (AR) system, the method comprising:
  receiving telemetry associated with first vehicles proximate a second vehicle that is driven by a user of the AR system;
  augmenting a real-world view of the first vehicles as seen by the user via the AR system, including:
    generating from the received telemetry vehicle indicia corresponding to the first vehicles;
    generating crowd-sourced indicators associated with the first vehicles; and
    displaying the vehicle indicia and the crowd-sourced indicators in registration with the real-world view of the first vehicles using position information of the first vehicles from the received telemetry so that the vehicle indicia move in registration with movement of their corresponding first vehicles; and
  displaying in a field of view of the AR system at least one crowd-sourced indicator, generated from the received telemetry, that represents a community assessment of the user of the AR system, the at least one crowd-sourced indicator comprising a compilation of individual assessments of the user of the AR system submitted by drivers among the first vehicles.

13. The method of claim 12, wherein the at least one crowd-sourced indicator is a rating of driving behavior of the user of the AR system and the individual assessments are individual ratings of the user's driving behavior submitted by the drivers among the first vehicles.

14. The method of claim 12, further comprising receiving spoken input from the user of the AR system that constitutes an assessment of a driver of one of the first vehicles, wherein the user of the AR system identifies the driver of one of the first vehicles by describing the driver's vehicle.

15. The method of claim 12, further comprising varying a visual appearance of the at least one crowd-source indicator according to a number of drivers among the first vehicles who have contributed to its compilation.

16. A non-transitory computer-readable storage medium having stored thereon computer executable instructions, which when executed by a computer device in an augmented reality (AR) system, cause the computer device to:
  receive telemetry associated with first vehicles proximate a second vehicle that is driven by a user of the AR system;
  augment a real-world view of the first vehicles as seen by the user via the AR system, wherein the one or more computer processors:
    generate from the received telemetry vehicle indicia corresponding to the first vehicles;
    generate crowd-sourced indicators associated with the first vehicles; and
    display the vehicle indicia and the crowd-sourced indicators in registration with the real-world view of the first vehicles using position information of the first vehicles from the received telemetry so that the vehicle indicia move in registration with movement of their corresponding first vehicles; and
  display in a field of view of the AR system at least one crowd-sourced indicator, generated from the received telemetry, that represents a community assessment of the user of the AR system, the at least one crowd-sourced indicator comprising a compilation of individual assessments of the user of the AR system submitted by drivers among the first vehicles.

17. The non-transitory computer-readable storage medium of claim 16, wherein the at least one crowd-sourced indicator is a rating of driving behavior of the user of the AR system and the individual assessments are individual ratings of the user's driving behavior submitted by the drivers among the first vehicles.

18. The non-transitory computer-readable storage medium of claim 16, wherein the computer executable instructions, which when executed by the computer device, further cause the computer device to vary a visual appearance of the at least one crowd-source indicator according to a number of drivers among the first vehicles who have contributed to its compilation.

* * * * *